United States Patent
LaRue et al.

(10) Patent No.: US 6,449,622 B1
(45) Date of Patent: Sep. 10, 2002

(54) SYSTEM AND METHODS FOR SYNCHRONIZING DATASETS WHEN DATASET CHANGES MAY BE RECEIVED OUT OF ORDER

(75) Inventors: Chris LaRue; Bryan Dube, both of Santa Cruz; Chiahua George Yu, Santa Clara, all of CA (US)

(73) Assignee: Starfish Software, Inc., Scotts Valley, CA (US)

(*) Notice: Subject to any disclaimer, the term of this patent is extended or adjusted under 35 U.S.C. 154(b) by 0 days.

(21) Appl. No.: 09/293,571

(22) Filed: Apr. 15, 1999

Related U.S. Application Data

(60) Provisional application No. 60/123,265, filed on Mar. 8, 1999.

(51) Int. Cl.[7] .............................................. G06F 17/30
(52) U.S. Cl. ........................ 707/201; 707/10; 707/8; 707/100; 707/202; 709/221; 709/213; 709/204
(58) Field of Search ...................... 707/8, 201, 202, 707/203, 10, 205, 204, 100, 200; 714/6, 13; 711/130, 9, 4, 113, 162, 202; 709/213, 204, 221

(56) References Cited

U.S. PATENT DOCUMENTS

| | | |
|---|---|---|
| 4,769,796 A | 9/1988 | Levine |
| 4,866,611 A | 9/1989 | Cree et al. |
| 4,881,179 A | 11/1989 | Vincent |
| 4,977,520 A | 12/1990 | McGaughey, III et al. |
| 5,113,380 A | 5/1992 | Levine |
| 5,224,212 A | 6/1993 | Rosenthal et al. |
| 5,392,390 A | 2/1995 | Crozier |
| 5,442,783 A | 8/1995 | Oswald et al. |
| 5,519,606 A | 5/1996 | Frid-Nielsen et al. |
| 5,666,530 A | 9/1997 | Clark et al. |
| 5,666,553 A | 9/1997 | Crozier |
| 5,684,990 A | 11/1997 | Boothby |
| 5,701,423 A | 12/1997 | Crozier |

(List continued on next page.)

*Primary Examiner*—Jean M. Corrielus
(74) *Attorney, Agent, or Firm*—C. George Yu

(57) ABSTRACT

A system and methods for synchronizing information in datasets via a communication medium are provided that are suitable for synchronizing even across communication mediums that are susceptible to high latency, non-FIFO (non-First-In-First-Out) delivery order, or other adverse characteristics. According to an aspect of the invention, a computer-implemented method is for synchronizing user data in a first dataset with user data in at least a second dataset via a communication medium. The user data in the first dataset and the user data in the second dataset are capable of having been independently modified prior to the synchronization. The method includes sending a dataset change from the first dataset, receiving the dataset change via the communication medium, and determining whether the received dataset change, hereinafter referred to as the just-received change, was sent earlier than another dataset change, hereinafter referred to as the previously-received change, from the first dataset that was received earlier than the receiving step. The method further includes performing synchronization of the first and the second datasets based at least in part on the determining step. The performing step includes refraining from propagating the just-received change into the second dataset, if the just-received change is determined in the determining step to have been sent earlier than the previously-received change. The performing step further includes propagating the just-received change into the second dataset, at least to an extent needed for reconciling the just-received change with the second dataset, otherwise.

42 Claims, 16 Drawing Sheets

U.S. PATENT DOCUMENTS

| | | |
|---|---|---|
| 5,710,922 A | 1/1998 | Alley et al. |
| 5,727,202 A | 3/1998 | Kucala |
| 5,729,735 A | 3/1998 | Meyering |
| 5,758,150 A | 5/1998 | Bell et al. |
| 5,758,355 A | 5/1998 | Buchanan |
| 5,778,346 A | 7/1998 | Frid-Nielsen et al. |
| 5,778,389 A | 7/1998 | Pruett et al. |
| 5,806,075 A * | 9/1998 | Jain et al. .................. 707/201 |
| 5,832,487 A | 11/1998 | Olds et al. |
| 5,845,293 A | 12/1998 | Veghte et al. |
| 5,884,323 A | 3/1999 | Hawkins et al. |
| 5,926,816 A * | 7/1999 | Bauer et al. |
| 5,966,714 A * | 10/1999 | Huang et al. ................ 707/201 |
| 5,991,771 A * | 11/1999 | Falls et al. .................. 707/202 |
| 6,026,413 A * | 2/2000 | Challenger et al. ......... 707/202 |

\* cited by examiner

*900*

| LATEST VALID INTERACTION WITH CLIENT FOR THIS RECORD | MODIFIED SINCE LATEST VALID INTERACTION ? | CLIENT NEEDED FIXING AFTER RECEIPT ? | | FRESH WITH RESPECT TO CLIENT ? |
|---|---|---|---|---|
| 901 ~ NONE | -- | -- | , | FRESH |
| 902 ~ SENT (& LATER ACK'D) | YES | -- | , | FRESH |
| 903 ~ SENT (& LATER ACK'D) | NO | -- | , | NOT FRESH |
| 904 ~ RECEIVED (EARLIEST RECEIPT OF LATEST-SENT) | YES | -- | , | FRESH |
| 905 ~ RECEIVED (EARLIEST RECEIPT OF LATEST-SENT) | NO | YES | , | FRESH |
| 906 ~ RECEIVED (EARLIEST RECEIPT OF LATEST-SENT) | NO | NO | , | NOT FRESH |

*FIG. 9*

SYSTEM AND METHODS FOR SYNCHRONIZING DATASETS WHEN DATASET CHANGES MAY BE RECEIVED OUT OF ORDER

RELATED APPLICATIONS

The present application is related to and claims the benefit of priority from the following commonly-owned U.S. patent applications, the disclosures of which are hereby incorporated by reference in their entirety, including any appendices or attachments thereof, for all purposes:

Ser. No. 09/289,551, filed Apr. 9, 1999, and entitled System and Methods for Synchronizing Databases Using Version Indicators to Detect Obsolete Changes; and serial No. 60/123,265, filed Mar. 8, 1999 and entitled System and Methods for Synchronizing Datasets in a Communication Environment Having High-latency or Other Adverse Characteristics.

The present application is also related to the following commonly-owned U.S. patent applications, the disclosures of which are hereby incorporated by reference in their entirety, including any appendices or attachments thereof, for all purposes:

Ser. No. 09/208,815, filed Dec. 8, 1998 and entitled System and Methods for Robust Synchronization oF Datasets;

serial No. 60/109,983, filed Nov. 25, 1998 and entitled System and Methods for Transaction-based Synchronization; and serial No. 60/106,189, filed Oct. 28, 1998 and entitled System and Method for Transaction-based Synchronization.

Ser. No. 09/136,215, filed Aug. 18, 1998 and entitled System and Methods for Synchronizing Two or More Datasets, now U.S. Pat. No. 6,295,541;

Ser. No. 09/136,212, filed Aug. 18, 1998 and entitled Data Processing Environment with Methods Providing Contemporaneous Synchronization of Two or More Clients, now U.S. Pat No. 6,275,831;

Ser. No. 08/923,612, filed Sep. 4, 1997 and entitled System and Methods for Sychronizing Information Among Disparate Datasets; and Ser. No. 08/693,677, filed Aug. 12, 1996 and entitled Scheduling System with Methods for Peer-to-peer Scheduling of Remote Users, now U.S. Pat. No. 6,016,478.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to synchronization of data—that is, the process of taking two or more separate collections of data ("datasets"), identifying differences among them, and applying changes to one or more of the datasets to make the datasets identical or equivalent.

With each passing day, there is ever increasing need for synchronization solutions for connected information devices. Here, information devices include for example general- or special-purpose computers of all types and sizes, Internet or intranet access devices, cellular phones, pagers, and other hand-held devices including, for example, REX PRO™, PalmPilot and Microsoft "Windows CE" devices, and the like.

(REX™ and REX PRO™ are trademarks of Franklin Electronic Publishers of Burlington, N.J. REX and REX PRO organizers include licensed technology from Starfish Software, Inc. ("Starfish"), the present assignee. PalmPilot organizers are produced by Palm Computing, Inc., a subsidiary of 3Com Corp. of Santa Clara, Calif. The Windows CE device operating system and other Microsoft software are produced by Microsoft Corporation of Redmond, Wash.)

As the use of information devices is ever growing, users often have their data in more than one device, or in more than one software application. Consider, for instance, a user who has his or her appointments and contacts on a desktop personal computer (PC) at work and also has appointments or contacts on a notebook computer at home and on a battery-powered, hand-held device for use in the field. The user is free to alter the information on any one of these devices independently of one another. What the user really wants is the information in each device to remain synchronized with corresponding information in other devices in a convenient, transparent manner. Still further, some devices are connected at least occasionally to a server computer (for example, an Internet server) which stores information for the user. The user would of course like the information on the server computer to participate in synchronization, so that the server computer also remains synchronized.

An early approach to maintaining consistency between datasets was simply to import or copy one dataset on top of another. This simple approach, one which overwrites a target dataset without any attempt at reconciling any differences, is inadequate for all but the simplest of applications. Expectedly, more sophisticated synchronization techniques were developed. In particular, a synchronization technique was developed, in which exactly two datasets are synchronized by a PC-based synchronization system that is specific to a particular other device (e.g., PalmPilot organizer). The synchronization is conducted in a single, intensive session via a direct local connection (e.g., serial cable or short infrared link) that is maintained during the entire synchronization. Thus, the prior synchronization technique is a session-based, connection-based technique.

The prior, PC-based synchronization system functions as follows. First, it directly requests and receives (i.e., reads) one record at a time from the other device's dataset via the local connection to obtain changes that have been made to that dataset since a previous synchronization. Then, the system similarly obtains changes that have been made to the PC's dataset since the previous synchronization. The system next resolves any identified conflicts involving these changes, for example, by asking the user to choose a winner from two changes that conflict. Finally, the system directly propagates (e.g., writes) the conflict-resolved changes from each of the datasets into the other dataset, to leave the two datasets in identical or equivalent states. During the synchronization, which typically lasts several minutes or less, both datasets are "locked" to prevent the user from modifying the datasets.

The prior synchronization techniques have their uses. However, as more and more types of devices are introduced that include datasets to be synchronized, a need has arisen for improved synchronization schemes to take advantage of (or compensate for) the particular characteristics of these new devices and datasets. Consider, for example, the fact that many modern devices such as pagers and cellular phones are now capable of distant wireless communication or Internet-based communication. It would be desirable to efficiently synchronize user information in such devices using such distant communication mediums. Further, because many of the modern devices are capable of conducting message-based or connectionless communication (e.g., electronic mail (e-mail) or wireless paging) as opposed to connection-based communication (e.g., direct serial connection), it would be desirable to efficiently synchronize the user information in such devices using message-based communication techniques, especially automated techniques that require little to no user intervention besides initiating synchronization. Unfortunately, the prior synchronization technique, which is designed for use over a direct local serial connection, is not well-adapted to the characteristics commonly associated with distant and/or message-based communication, especially if errors occur during communication, as will be described.

Consider for instance the characteristic of high communication latency, which is unavoidable for certain popular communication technologies such as paging or e-mail. Paging or e-mail messages can take minutes, hours, or sometimes even longer (e.g., days) to be delivered, when the messages are not lost outright. Clearly, the prior synchronization scheme, which requires numerous sequential communication exchanges (e.g., one request-response cycle per data record), will be intolerably slow to finish if directly applied to synchronize datasets across such high-latency communication mediums.

Further, if a synchronization might take a long time to finish (e.g., more than thirty minutes), due for example to high latency, the user would want to use (e.g., modify) his or her data during the synchronization. The prior synchronization system cannot accommodate such a user because the system locks the datasets against modifications during every synchronization. The prior synchronization system cannot be rescued simply by modifying it to leave the datasets unlocked during synchronization because then the modified system would not guarantee data integrity. In particular, suppose the prior system, during a synchronization, reads a handheld device's data record "Bill Smith, version A" at time 1, and updates it with a PC's updated corresponding data record "Bill Smith, version B" at time 3. If the prior system were modified to allow the user to hand-modify the record at time 2 into "Bill Smith, version C" in the middle of the synchronization, then the just-made modification ("version C") would be overwritten at time 3 as a part of the synchronization without any attempt to determine whether the just-made modification ("version C") is in fact the one that should be retained—i.e, without any conflict resolution. In short, the user's desired information (when "version C" is the desired information) may be erroneously overwritten if the prior synchronization system is simply modified not to lock the datasets during synchronization.

In addition to high latency, communication environments (e.g., wireless, message-based, or Internet-based environments) may also have other characteristics such as low or intermittent reliability and availability, low or expensive bandwidth, inability to guarantee FIFO (first-in-first-out) delivery order, and the like. Each of these other characteristics introduces additional problems to the synchronization task. Furthermore, combinations of such communication characteristics makes the problems especially difficult to solve. To take just one example, consider the task of synchronizing over a communication medium that cannot guarantee FIFO delivery order for transmissions and is susceptible to high latency (e.g., latency longer than an hour or longer than a day). Suppose that, in a first synchronization, some synchronization-related messages containing data are sent across this communication medium. Suppose that the user thereafter makes changes to one of the datasets involved, in the ordinary course of using the dataset. Then, perhaps hours or days later, the user attempts a second synchronization over the communication medium. The second synchronization finishes and leaves correctly-synchronized datasets. However, the now-obsolete synchronization-related messages sent during the earlier first synchronization may now arrive at one or more of the datasets (i.e., in non-FIFO order). If these messages are obeyed, the already-correctly-synchronized datasets may become corrupted with obsolete data from the now-obsolete messages. In short, the user's desired information is endangered by a characteristic of the communication medium that affects synchronization.

Additional problems and difficulties caused by communication characteristics that are associated with wireless, Internet-based, or message-based communication mediums, and by the interplay of such characteristics, will be further discussed below. In summary, these problems and difficulties cause an irony that user data stored for example in cellular phones or pagers typically cannot be synchronized with data in other devices via cellular phone calls or pager messages in the field in an efficient, error-free, and cost-effective manner. Instead, users typically must wait until they return home or to the office to synchronize their cellular phone or pager with a PC via a serial cable or short infrared link. Thus, such devices created expressly for use in the field are in practice no more portable than desktop office machines, when synchronization is the desired task.

Clearly, there is a need for improved synchronization systems and techniques that are suitable for synchronization via wireless or message-based communication networks (such as cellular or pager networks) or other networks (such as the Internet) that have similar characteristics. The present invention fulfills this and other needs.

SUMMARY OF THE INVENTION

The present invention provides a system and methods for synchronizing information in datasets via a communication medium. The system and methods are suitable for synchronizing even across communication mediums that are susceptible to high latency, non-FIFO delivery order, or other adverse characteristics. According to an aspect of the invention, in an information processing system, a method for synchronizing a first dataset with at least a second dataset via a communication medium includes a step of storing information that is indicative of a first version of user data of the first dataset, wherein the first version was involved in prior use for synchronizing with the second dataset. The method further includes steps of identifying a change in the second dataset that is new relative to the first version of the user data of the first dataset; via the communication medium, communicating the change in the second dataset and indicating the first version based on the stored information; determining whether user data currently in the first dataset has changed relative to the first version that was indicated in the communicating and indicating step; deciding whether to commit the communicated change to the first dataset based at least in part on the determining step; and committing the communicated change to the first dataset if the communicated change is decided to be committed in the deciding step.

According to another aspect of the invention, a computer-implemented method is for synchronizing user data in a first dataset with user data in at least a second dataset via a communication medium. The user data in the first dataset and the user data in the second dataset are capable of having been independently modified prior to the synchronization. The method includes sending a dataset change from the first dataset, receiving the dataset change via the communication medium, and determining whether the received dataset change, hereinafter referred to as the just-received change, was sent earlier than another dataset change, hereinafter referred to as the previously-received change, from the first dataset that was received earlier than the receiving step. The method further includes performing synchronization of the first and the second datasets based at least in part on the determining step. The performing step includes refraining from propagating the just-received change into the second dataset, if the just-received change is determined in the determining step to have been sent earlier than the previously-received change. The performing step further includes propagating the just-received change into the second dataset, at least to an extent needed for reconciling the just-received change with the second dataset, otherwise.

In another embodiment, a system is provided for synchronizing a first dataset residing on a first device with a second dataset residing on a second device. The first and second devices are capable of mutual communication via a communication network. The system includes a first synchronization interface, status fields, and a second synchronization interface. The first synchronization interface is configured to access the first dataset and to send synchronization messages reflecting data records of the first dataset via the communication network. The status fields are associated with the second dataset and are for maintaining information about past synchronization activity between the first and second datasets. The second synchronization interface is configured to access the second dataset and to receive synchronization messages reflecting data records of the first dataset via the communication network. The second synchronization interface is further configured to: (1) refrain from altering the second dataset in response to a received synchronization message sent by the first synchronization interface if the received synchronization message was sent earlier but received later than another synchronization message from the first dataset; and (2) to alter the second dataset in response to the received synchronization message at least to an extent for reconciling the first and second datasets if the received synchronization message was not sent earlier but received later than the other synchronization message from the first dataset.

In still another embodiment, a computer-implemented method is provided for handling dataset changes, in synchronizing user data in a first dataset with user data in at least a second dataset via a communication medium. Here, the user data in the first dataset and the user data in the second dataset are capable of having been independently modified prior to the synchronization. The method includes a step of sending at least a first dataset change from the first dataset, wherein the sending step includes sending an indicator of send order. The method further includes steps of receiving the first dataset change and the indicator of send order, via the communication medium; determining based on the indicator of send order whether the received first dataset change, referred to as the just-received change, was sent earlier than a previously-received dataset change from the first dataset; if the just-received change is determined in the determining step to have been sent earlier than the previously-received dataset change, refraining from propagating the just-received change into the second dataset; and, otherwise, propagating the just-received change into the second dataset, at least to an extent needed for reconciling the just-received change with the second dataset.

According to still another aspect of the invention, a computer-implemented method is provided for synchronizing user data in a first dataset with user data in at least a second dataset. The first dataset and the second dataset each is capable of including dataset changes that have been made independently of any synchronization with the other of the first and the second datasets. The method includes a step of sending at least some of the dataset changes of the first dataset. The method further includes steps of receiving and propagating the sent dataset changes of the first dataset into the second dataset, at least insofar as the sent dataset changes of the first dataset can be reconciled with the second dataset; sending at least some of the dataset changes of the second dataset, wherein the two sending steps are intentionally not undertaken within any single communication session, and, between the two sending steps, no sending of any dataset changes occurs between the first and the second datasets; and receiving and propagating the dataset changes from the second dataset into the first dataset, at least insofar as the dataset changes from the second dataset can be reconciled with the first dataset.

BRIEF DESCRIPTION OF THE DRAWINGS

FIG. 9 is a logic table that shows logic used by the synchronizer to determine the GUD records that need to be propagated to a client, according to the preferred embodiment.

DETAILED DESCRIPTION OF SPECIFIC EMBODIMENTS

I. The Synchronization System

A. System Hardware

Figure 1A:
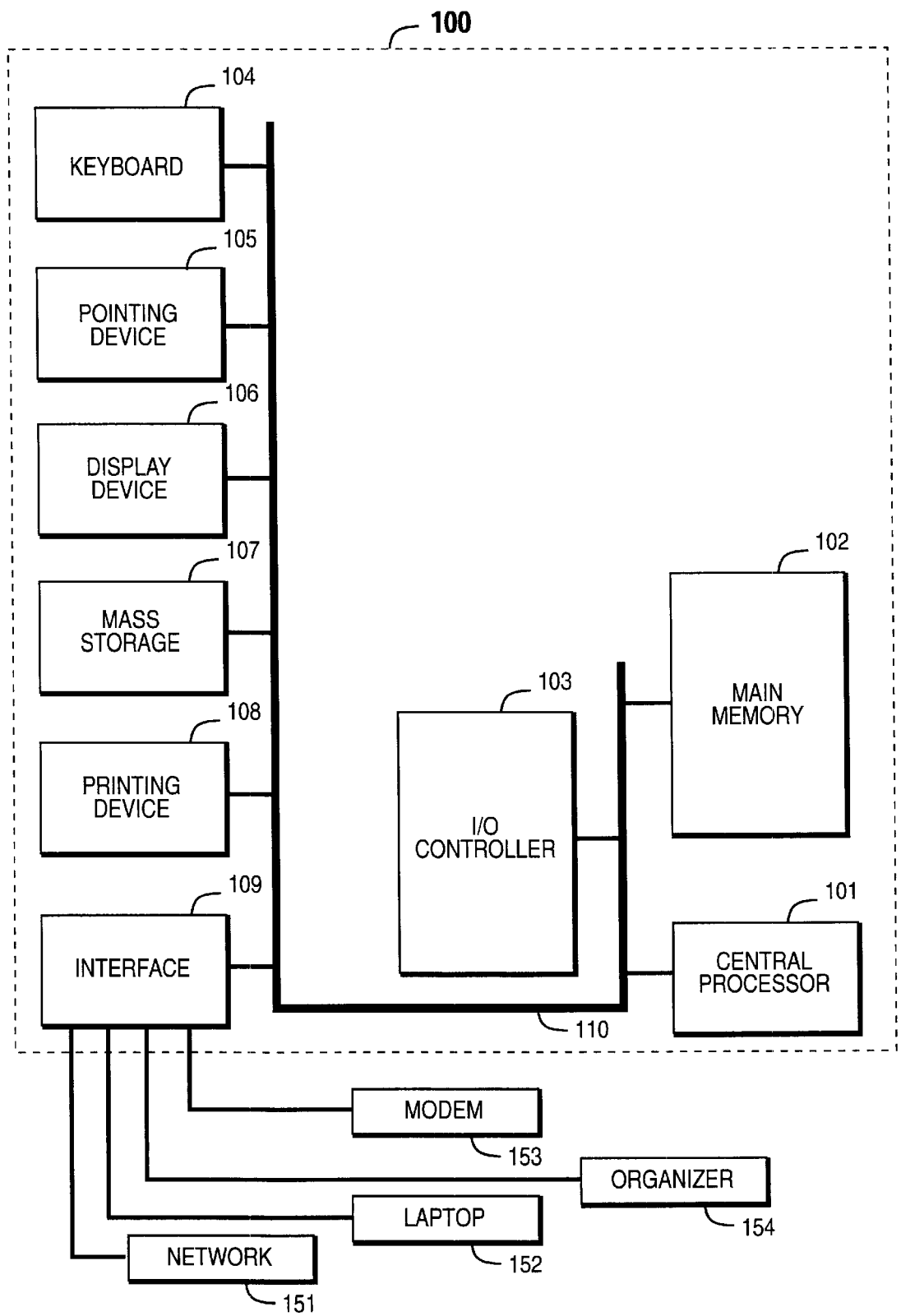
FIG. 1A is a block diagram of a computer system in which the present invention may be embodied.

The present invention may be embodied on an information processing system such as the system 100 of FIG. 1A, which comprises a central processor 101, a main memory 102, an input/output (I/O) controller 103, a keyboard 104, a pointing device 105, pen device (or the like), a screen or display device 106, a mass storage 107 (for example, hard disk, removable floppy disk, optical disk, magneto-optical disk, or flash memory, and the like, etc.), one or more optional output device(s) 108, and an interface 109. Although not shown separately, a real-time system clock is included with the system 100, in a conventional manner. The various components of the system 100 communicate through a system bus 110 or similar architecture. In addition, the system 100 may communicate with or include other devices through the interface or communication port 109, which may be an RS-232 serial port or the like. Devices which will be commonly connected to the interface 109 include a network 151 (for example, a LAN (Local Area Network), a wireless communication network, the Internet, and the like), a laptop computer 152, a handheld organizer 154 (for example, the REX PRO™ organizer), a modem 153, and the like.

In operation, program logic (implementing the methodologies described below) is loaded from the storage device or mass storage 107 into the main memory 102, for execution by the processor 101. Similarly, program logic (implementing the methodologies described below) may be loaded into any included or connected devices. During operation of the program (logic), the user enters commands through the keyboard 104 and/or pointing device 105 which is typically a mouse, a track ball, or the like. The computer system displays text and/or graphic images and other data on the display device 106, such as a cathode-ray tube or an LCD display. A hard copy of the displayed information, or other information within the system 100, may be obtained from the output device 108 (for example, a printer). In an embodiment, the computer system 100 includes an IBM PC-compatible personal computer (available from a variety of vendors, including IBM of Armonk, N.Y.) running Windows 9x or Windows NT (available from Microsoft Corporation of Redmond, Wash.). In a preferred embodiment, the system 100 is an Internet, intranet, wireless or other type of network server and receives input from and sends output to a remote user via the interface 109 according to standard techniques and protocols.

B. System Software

Figure 1B:
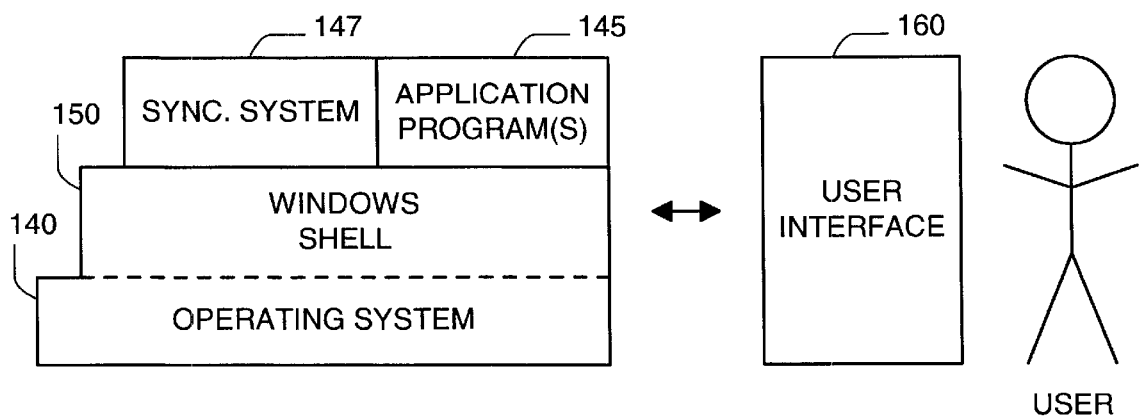
FIG. 1B is a block diagram of a software system of the present invention for controlling operation of the system of FIG. 1A.

Illustrated in FIG. 1B, a computer software system 120 is provided for directing the operation of the computer system 100. Software system 120, which is stored in system memory 102 and on storage (for example, disk memory) 107, includes a kernel or operating system (OS) 140 and a windows shell 150. One or more application programs, such as client application software or "programs" 145 may be "loaded" (i.e., transferred from storage 107 into memory 102) for execution by the system 100.

System 120 typically includes an optional user interface (UI) 160, preferably a Graphical User Interface (GUI), for receiving user commands and data and for producing output to the user. These inputs, in turn, may be acted upon by the system 100 in accordance with instructions from operating system module 140, windows module 150, and/or client application module(s) 145. The UI 160 also serves to display the user prompts and results of operation from the OS 140, windows 150, and application(s) 145, whereupon the user may supply additional inputs or terminate the session. In one embodiment, OS 140 and windows 145 together comprise Microsoft Windows software (for example, Windows 9x or Windows NT). Although shown conceptually as a separate module, the UI is typically provided by interaction of the application modules with the windows shell and the OS 140. One application program 147 includes the synchronizer core 240 according to embodiments of the present invention, which will be described in further detail below. In the preferred embodiment, OS 140 is part of an Internet server, and the UI 160 is provided at a remote computer via the Internet using standard Internet protocols.

C. A Modular View of the Synchronization System in its Environment

Figure 2:
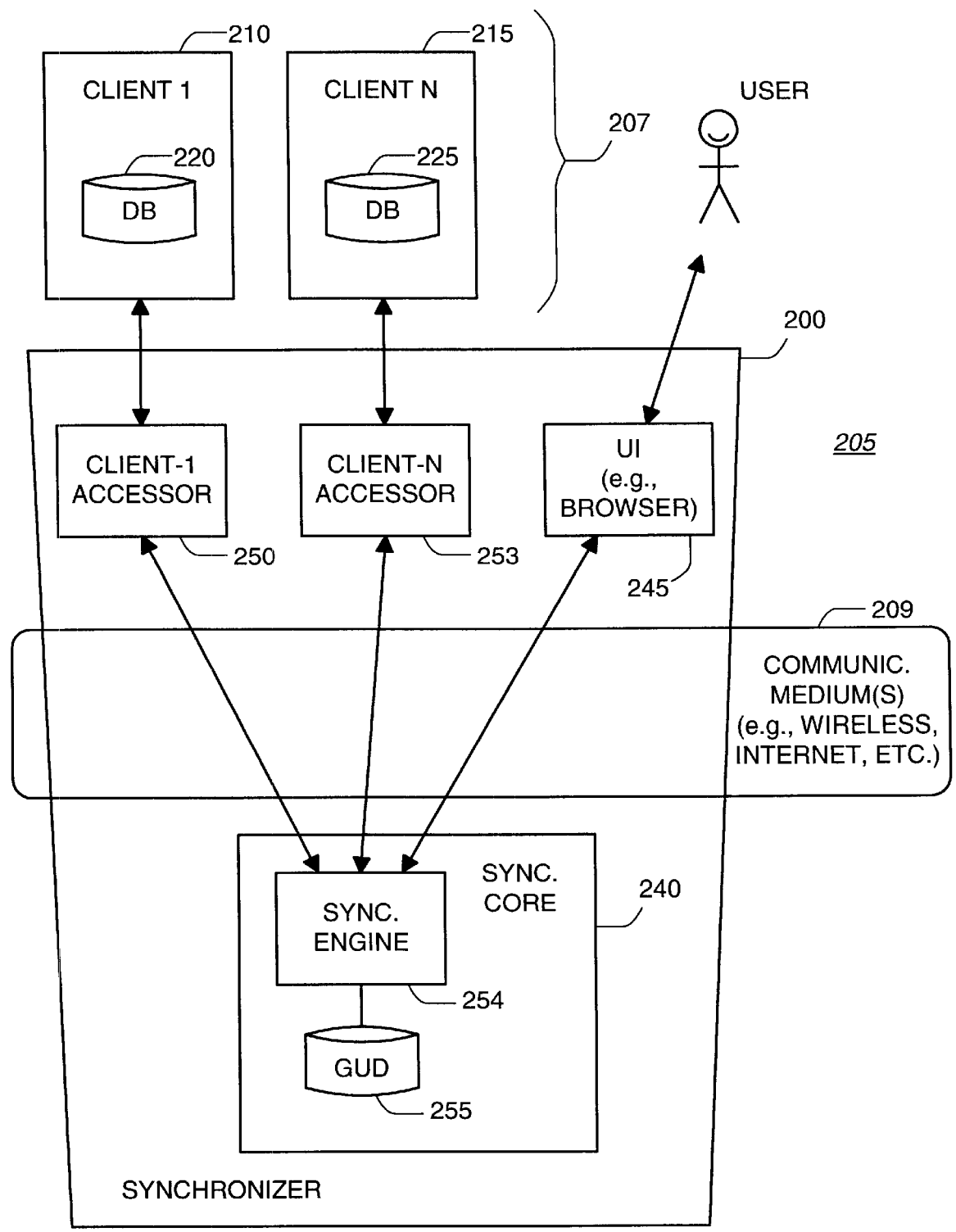
FIG. 2 is a block diagram that shows the synchronization system ("synchronizer") according to an embodiment of the present invention.

FIG. 2 is a block diagram that shows a synchronization system 200 ("synchronizer") according to an embodiment of the present invention in an example environment 205. The environment 205 includes communication mediums 209 (e.g., wireless network, Internet, and the like) and a number of synchronization clients 207. The synchronization clients 207 include user datasets and may participate in synchronization. Examples of possible clients 207 include the PalmPilot organizer, the REX™ organizer, and PIM software applications such as Microsoft Outlook or Starfish's Sidekick®. (Sidekick® is a registered trademark of Starfish.) As shown, the clients 207 include a first synchronization client 210 and an N-th synchronization client 215 that respectively include a dataset 220 and a dataset 225. The communication mediums 209 may include, for example, the Internet, or wire-line and wireless communication channels of all types.

The synchronizer 200 includes a synchronizer core 240, an optional User Interface 245 (UI), and client accessors including for example a first client's accessor 250 and an N-th client's accessor 253. The synchronizer core includes a synchronization engine 254 and a reference dataset 255. Each client accessor includes sufficient knowledge (e.g., client-specific knowledge) to enable the accessor to access (for example, read and write) information on a client's dataset and to communication such information to and from the synchronizer core 240, via the communication mediums 209. Each client accessor may and preferably does run on a same machine as the client, e.g., on a remote machine with respect to the synchronizer core. Information stored by a client accessor is preferably stored on the accessor's local machine for efficiency, or may be stored with the synchronizer core and accessed by the accessor via its connection with the synchronizer core. The Synchronization engine 254 controls the reference dataset 255, which is also referred to as the synchronizer dataset or GUD ("Grand Unification Dataset"). The GUD is for storing a super-set of data from all datasets. Together, the synchronizer core 240 and the client accessors manage the synchronization process. The optional UI 245 provides optional interactive input and output to a user during the synchronization process. The UI optionally includes a browser or terminal or similar user interface technology and enables the user to view or modify the information in the GUD to thereby provide PIM functionality using the GUD. The synchronizer of FIG. 2 may be constructed from Starfish synchronization system(s) that are described, for example, in the incorporated U.S. patent applications having Ser. Nos. 09/136,215 and 09/208,815 by adding the additional features and synchronization methods described in the present document.

In the remainder of this document, the terms "client" or "client dataset" alone may be used to refer to the synchronizer's client dataset accessor, and the terms "synchronizer" or "server" alone may be used to refer to the synchronizer core (e.g., core logic and/or reference dataset), for simplicity. Context should make clear the intended meaning where a distinction is actually necessary.

II. Challenges of Synchronizing Over Wireless, Message-Based, or Similar Networks

A. Introduction

In synchronization by embodiments of the present invention, a synchronizer generally establishes a correspondence among data records across datasets, for example during a first synchronization. For example, a client's records are mapped to corresponding GUD records. In a subsequent synchronization, the synchronizer determines changes (for example, all changes) that have been made to a dataset since a previous synchronization involving the dataset. Next, the synchronizer makes corresponding changes in another dataset, to the extent that such changes can be reconciled with the other dataset.

Generally speaking, synchronization for a record or a set of records in a device includes an outbound phase and an inbound phase with respect to the device. In the outbound phase, changes (e.g., additions, modifications, or deletions) that have been made since a previous synchronization are extracted from the particular dataset. In the inbound phase, changes from another dataset are communicated to the particular dataset. In general, for ordinary client datasets (e.g., datasets other than the synchronizer's own reference dataset), the outbound phase precedes the inbound phase for any record.

One approach to synchronization is to perform each synchronization in a single intensive session across devices via a highly-reliable, bi-directional serial connection that has relatively high bandwidth and low latency. Once synchronization is started, the synchronization logic will attempt to begin and finish both outbound and inbound phases with respect to any client dataset without intentional pause or interruption. In the event of non-intentional interruption, such as caused by a user's accidentally unplugging a serial cable during synchronization, the broken connection is easily detected and the entire synchronization can quickly and reliably be recognized as terminated both at the client dataset's side and at the synchronizer's side of the broken connection.

In the above-described approach, the serial communications connection may be made across a wireline connection or a short infrared link. With such a connection, the synchronization logic (e.g., conducted by a PC-based program) can directly access both datasets similarly to the way a program might access files in file systems. Under such an approach to dataset access, the synchronization logic may conduct communication exchanges over the serial connection that are best described as "chatty." For example, the synchronization logic may exchange numerous signals and acknowledgments over the connection in a linear fashion. In particular, synchronization logic at one end of the connection may specifically request (e.g., read) records, one at a time, from the client dataset at the other end of the connection. The synchronization logic waits until one requested record is received before requesting the next record.

B. High Latency

Latency is a fact of life for certain communication technologies. For example, e-mail and paging messages can take minutes, hours, or even longer (e.g., days) to be delivered. Such high latency raises difficulties for synchronization. For example, a chatty, linear, session-based synchronization scheme that requires numerous sequential communication exchanges (e.g., one exchange per record) will be intolerably slow to finish in a high-latency environment. Therefore, what is needed are less-chatty synchronization technique(s) that minimize the number of required, sequential communication exchanges.

Another difficulty with high latency is that, if a full synchronization for a client dataset take a long time to finish, e.g., due to high latency, then it would be undesirable to forbid the user from changing the client dataset (e.g., changing an appointment in the calendar) during the entire, long synchronization. But if the user were allowed to change the client dataset (i.e., if the client dataset is not locked) for example between the outbound and inbound phases of a synchronization, then inbound changes from the synchronizer, if made unquestioningly at the client dataset, may overwrite the user's latest changes. This overwriting would likely be wrong, given that the user's changes are likely to reflect the latest, desired information. Therefore, what is needed are synchronization technique(s) that can allow a client dataset to be changed during a synchronization without also permitting errors such as loss of wanted data.

It is worth noting that the above-described data loss would be caused in part by the unquestioning making of inbound changes at the client dataset. And yet, the unquestioning making of such changes is otherwise an attractive feature that helps to largely confine synchronization logic (e.g., conflict-resolution logic) to the synchronizer's core. Largely confining the synchronization logic to the synchronizer's core permits the client-specific accessor logic for each client dataset to be relatively simple, so that even simple client datasets or devices (e.g., devices without real-time clocks) can be capable of supporting adequate accessor logic. This ability to work even with simple datasets and devices is worth preserving. Therefore, what is also needed are synchronization technique(s) that continue to be suitable for synchronizing even simple client datasets or devices, even as the technique(s) also allow a client dataset to be changed during a synchronization without permitting errors such as loss of wanted data.

High latency also has other consequences. For instance, high latency also causes a need by users for more flexible synchronization modalities. Rather than tarrying through an entire, full synchronization that is made very time-consuming due to latency, the user in the field would sometimes wish to perform just the most urgently needed synchronizations transactions. Such flexible synchronization modalities are more fully introduced below, in connection with low bandwidth. Another consequence of high latency is that detection of communication errors, and recovery from such errors, becomes difficult. This problem is more fully introduced below in connection with low reliability.

C. Expensive or Low Bandwidth

As most cellular-phone or wireless pager subscribers can attest, communication bandwidth can be expensive, especially during peak-usage hours. Therefore, a full, two-phased (inbound and outbound) synchronization via a wireless communication network may not, in fact, always be desirable. Nevertheless, users in the field sometimes wish to use even expensive bandwidth to perform certain synchronization tasks, if the tasks can be performed without having to perform a full, two-phased synchronization. Consider for example a user who has just made one or several important changes to her client dataset in the field. The user wishes to send immediately (outbound) these changes (perhaps ignoring other changes) to the synchronization server—i.e., to other dataset(s). The user further wishes, however, not to initiate any return changes (inbound) from the synchronization server. A session-based synchronization technique that requires full, two-phased synchronization, cannot accommodate the user's wishes.

Consider also a user in the field who wishes to obtain the latest changes (inbound) from the synchronization server—i.e., from other dataset(s). This user further wishes not to first send (outbound) any changes, perhaps because the user is using a pager from which outbound messages are extremely expensive or slow. Again, a rigid session-based synchronization scheme that requires in-order, two-phased synchronization cannot accommodate such a desired synchronization transaction. As can be seen, what is needed are technique(s) for conducting synchronization transactions outside the context of a full, in-order, two-phased synchronization.

D. Low Reliability or Inconsistent Availability

Certain communication systems have low reliability or inconsistent availability. Low reliability may take the form of, for example, lost messages or spontaneous disconnection. Early versions of traditional, session-based synchronization (e.g., over a serial connection), dealt with communication errors or failure, if at all, simply by breaking the connection (if it has not already been broken) and aborting the synchronization. Thereafter, the user may initiate a new, full synchronization session, hopefully to its completion. (Starfish has developed a robust technique that improves upon the traditional, session-based synchronization scheme by being able, in the new synchronization session, to avoid repeating outbound transmissions that were already performed in the first session before it was aborted. This technique is further described for example in the incorporated U.S. patent application having Ser. Nos. 09/208,815.)

Once synchronization is liberated, however, from the session-based, connection-based, chatty model, as urged in the preceding discussions, then error detection and recovery become more difficult. In particular, in a high-latency environment that does not maintain an open connection throughout a synchronization, it may not be simple to abort a synchronization. For example, even if one or even both sides (e.g., the client and/or the server sides) of a synchronization considers the synchronization to be aborted, there is no guarantee that one side will not continue to receive transmissions for the "aborted" synchronization. Such ghostly transmissions, and other consequences of poor reliability combined with high latency, must be taken into account. Therefore, what is needed are synchronization technique(s) that can properly detect and recover from errors, even in a high-latency, unreliable, or connectionless environment or in the face of late-arriving, no-longer-needed transmissions.

E. Non-FIFO Delivery

In some communication systems, especially message-based or connectionless systems, there may not be a guarantee that transmissions will be delivered in FIFO order. This inability to guarantee order can cause a variety of problems. Such problems are exacerbated if there is a design goal to keep the client dataset's accessor logic relatively simple as compared to the synchronizer core's logic to better support simple client datasets or devices. Therefore, what is needed are synchronization technique(s) that can properly function even across communication systems that do not guarantee FIFO delivery and even for relatively simple client datasets or devices (such as client datasets and devices without real-time clocks).

F. Asymmetry of Communication Characteristics

In certain communication systems, characteristics such as bandwidth, cost, latency, availability, and the like are different between the outbound and inbound directions with respect to a client dataset. Similarly, communication characteristics may differ based on the time of day or other factors. Such differences are another reason why users need the more flexible synchronization transactions envisioned in the previous discussions. Therefore, what is needed are synchronization technique(s) that can be selective about which transactions to execute under which circumstances to obtain better overall performance and cost-effectiveness.

III. Overview of Synchronization Methodologies

A. Problem: Received "Conflict-free" Change Involves Locally-changed Record

1. Introduction

Under a generally desirable model of synchronization, the sequence of operations for a synchronization is as follows:

(1) a client temporarily locks its dataset (i.e., prevents the user from changing the dataset);

(2) the client sends all its changes that are fresh, or new, with respect to the server to the server; (changes in one dataset are fresh with respect to another dataset if the changes include values or status, e.g., "deleted", that the other dataset may not know;)

(3) the server resolves any conflicts involving the fresh client changes and commits the conflict-resolved changes into the GUD; (all data records in the GUD in this model are conflict-resolved (i.e., conflict-free) records;)

(4) the server sends all its changes that are fresh with respect to the client to the client;

(5) the client commits the fresh, conflict-resolved server changes into the client's dataset without question, since these changes are from the server and are therefore conflict-resolved;

(6) the client unlocks its dataset.

The above model is adequate for certain applications. In a high-latency communication environment, however, it is not desirable for the client to lock the client dataset after sending its changes and while waiting to receive the conflict-resolved changes. Therefore, according to the preferred embodiment, the client does not lock its dataset during synchronization (especially if the synchronization can or will take more than ten minutes or more than an hour to synchronize less than about 500 records), and the user is free to change the client's dataset during synchronization. In addition, as will be further described in a later section, the preferred embodiment permits changes to be sent from the server even if the server has not seen all the client's fresh changes. As a result, when the "conflict-free" changes are received from the server, they may be conflict-free only with respect to an earlier version of the client's dataset, and may not be conflict-free with respect to current versions of client records. Put another way, the changes received from the server may involve records present in the client that are fresh with respect to the server, such as client records that have been newly-changed by the user during the present synchronization. If the client simply commits the received changes without question, the fresh user records already in the client (e.g., newly-changed records) may be overwritten, even though the fresh records may reflect user-desired information that should not be overwritten.

2. The Preferred Solution: Automatically Refrain from Overwriting

As will be further discussed, a solution to the above-described problem according to the present invention involves having the client detect whether any received changes involve client records that are fresh versus the sender, and handling any such changes in special ways (e.g., discarding them or locally performing conflict detection or resolution). The preferred embodiment allows the client to make its detection automatically without needing to compare timestamps from different clocks and without locally performing conflict resolution by making the user decide. (Comparison of timestamps will be further discussed in a later section.) As will be discussed, the preferred solution involves having the "other" side of a synchronization (e.g., the server's side) (e.g., the side sending changes believed to be "conflict-free") include information about the other side's knowledge of "this" side's records (e.g., the client's side's records). The information can then be used on this side to detect that local data has changed versus the other side's knowledge of this side and that therefore the changes received from the other side are suspect and not necessarily conflict-free.

Figure 3:
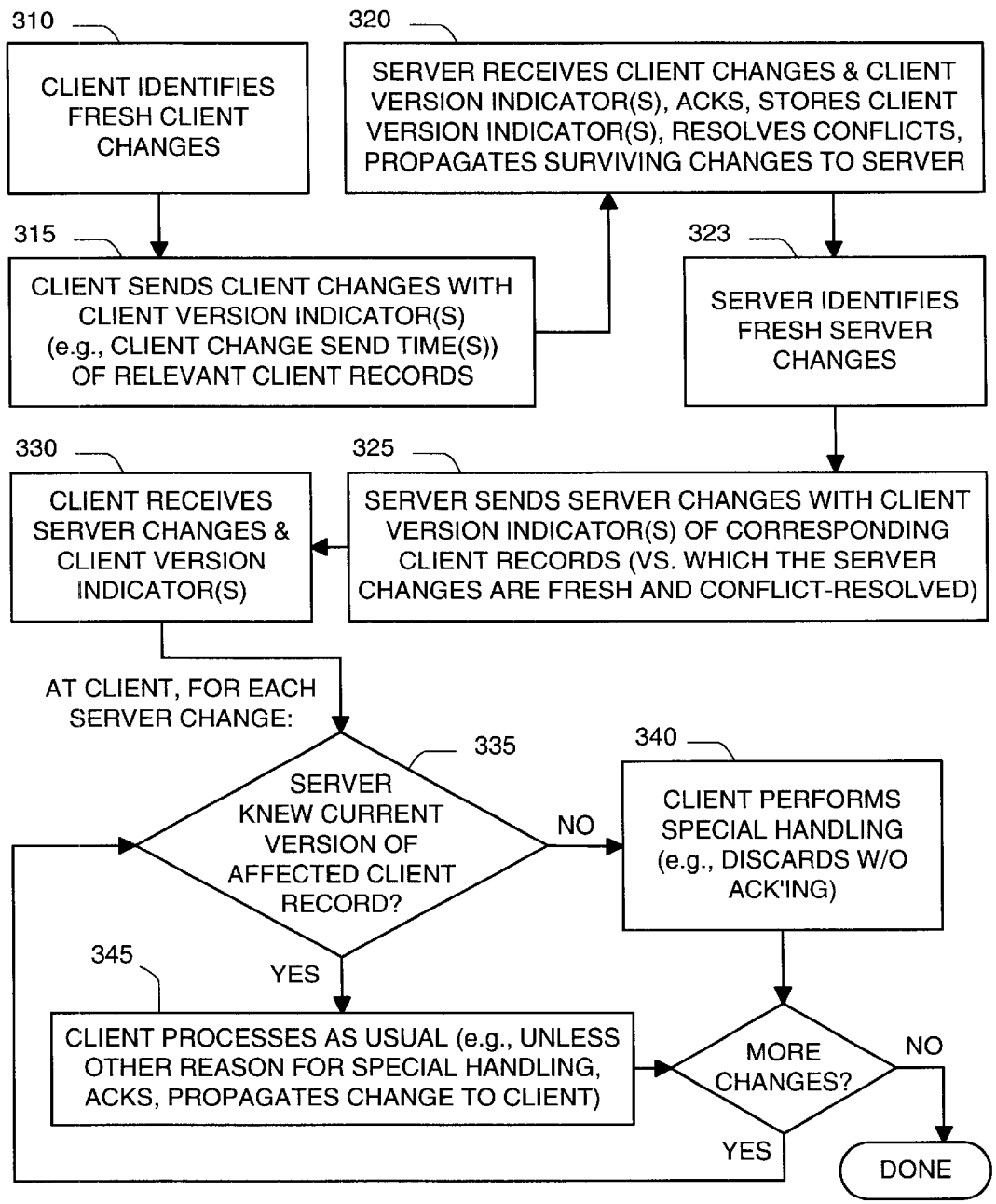
FIG. 3 is a flowchart that shows a synchronization method that permits a user to change a client dataset independently of an in-progress synchronization (e.g., a prolonged synchronization over a high-latency network), according to the preferred embodiment of the present invention.

FIG. 3 is a flowchart that shows a synchronization method 300 that embodies the preferred solution. The method 300 includes a step 310, in which the client identifies client record changes that are fresh versus the server. The client sends these fresh client record changes to the server in a step 315 and includes, in the sending, indicator(s) that indicate the current version of each client record whose change is being sent. These indicator(s) preferably take the form of the change send time for each change, according to the client's clock. A single send time may be sent as the version indicator for a group of changes that are considered to be sent at the same time. The change send time for a change, in essence, establishes that the sent change reflects a version of a record that was modified no later than the change send time. In an alternative embodiment, the modification time of each client record is itself directly used as the record's version indicator. The method 300 is especially preferred if the communication medium involved (e.g., wireless or wireline) is susceptible to communication latency of greater than about a minute, or greater than about thirty minutes, or greater than about an hour, or greater than about three hours.

In a step 320, the server receives the client changes and their client version indicator(s); acknowledges receipt of the client changes to the client (e.g., if asked) if no errors are encountered; performs conflict resolution on the received changes versus any changes in the GUD (e.g., changes received from other clients or from the user); propagates the client changes that survive conflict-resolution into the GUD; stores in the GUD, for each GUD record corresponding to a client change, the version indicator of the client change against which the GUD record is now conflict-free (e.g., conflict-resolved). After the step 320, the server, in a step 323, identifies GUD changes that are fresh versus the client. Because records in the GUD are conflict-free, the identified GUD changes are also conflict-free versus the last known state of the client. The server sends the fresh GUD changes to the client in a step 325 and includes in the sending, for each GUD record, the client version indicator of the last-known corresponding client record (if any), against which the GUD record is conflict-free (e.g., conflict-resolved).

Note that the conflict resolution performed by the server in the step 320 preferably includes automatic, timestamp-based conflict resolution (e.g., latest change always wins) that typically involves comparison of timestamps from different clocks. In particular, the server compares each client change's modification timestamp, which is preferably received along with the client changes, with "priority time (s)" that the server has stored for the corresponding GUD record's field(s) (which time(s) are typically the latest modification timestamps for the relevant record field(s) previously received from any client). The version indicators of the method 300 are not necessarily the same as such modification timestamps that may or may not otherwise be provided with the dataset changes for general use in conflict resolution against changes from different datasets. Indeed, as has been stated, in the preferred embodiment the version indicators are send-times, not modification times. In general, the method 300 can be operated, without requiring comparison of timestamps from different clocks and without requiring user input, independently of whatever conflict-resolution method is used.

In a step 330, the client receives the GUD changes including the version-indicator(s) of the GUD changes' last-known corresponding client records. In a step 335, the client determines, from the version indicators for each received GUD change, whether the GUD change is conflict-free from the server with respect to the current version, or an earlier version, of the corresponding client record. For example, if the corresponding client record has changed since the version indicated by the received version indicator, then the GUD change is conflict-free with respect to an earlier version of the client record. If this is the determination, then the GUD change is suspect and in a step 340 is subject to special handling. If not, then the GUD change is conflict-free (e.g., conflict-resolved) with respect to the current version of the client record, and the GUD change in a step 345 is subject to normal handling.

For simplicity, special handling in the step 340 preferably means that the client discards the GUD change, and will not acknowledge its correct, ordinary receipt in the ordinary manner to the server (e.g., if asked). (Acknowledgment of receipt of sent changes and other details of synchronization communications will be further discussed in a later section.) As an alternative to discarding suspect GUD changes, a client can be more sophisticated and perform conflict resolution locally to the degree that it is capable. For example, if the client is actually another instance of the synchronizer, the GUD of which instance is acting as a client dataset, then the client can perform full conflict resolution according to the server's methodology. Under normal handling in the step 345, if the client finds no further reason to discard or otherwise specially handle the received GUD change, then the client will acknowledge receipt of the GUD change (e.g., if asked to acknowledge by the server), as will be further discussed, and the client propagates the GUD change to the client dataset in its ordinary way. Additional details underlying the steps of the method 300 will be discussed in later section(s).

B. Problem: Received Change is Received Out of Order

1. Introduction

If the communication system being used between the client and the server cannot guarantee FIFO ordering, a dataset change or other signal may be received out of order. Such a change may be obsolete. A solution to this problem according to the present invention involves detecting at the receiving side whether any received changes involving a same record have been received out of order and handling any such changes in special ways (e.g., discarding them). Such detection and special handling is especially preferred in a receiving side (e.g., a client's side) that receives changes that would be conflict-free if FIFO delivery order actually were guaranteed.

Preferably, changes that are received out-of-order with respect to changes involving different records are still used, and changes are specially handled (e.g., discarded) due to out-of-order receipt only if they involve a particular record that was also the subject of a later-sent but earlier-received change from the other side. For example, consider the following scenario:

Time 1: The server sends changes A1 and B1 reflecting current server records A and B, respectively.

Time 2: Record B is modified in the server.

Time 3: The server then sends a new change B3 reflecting the current server record B.

If the client receives the change B3 before changes A1 and B1 (i.e., in non-FIFO order), the client should commit the change B3 (e.g., immediately) such that the corresponding client record also reflects the server record of Times 2 and 3. When the client later receives the changes A1 and B1 (i.e., in non-FIFO order), the client should still commit the change A1 (e.g., immediately), but should ignore the change B1.

2. The Preferred Solution: Use Change, But Refrain If Harmful

Figure 4A:
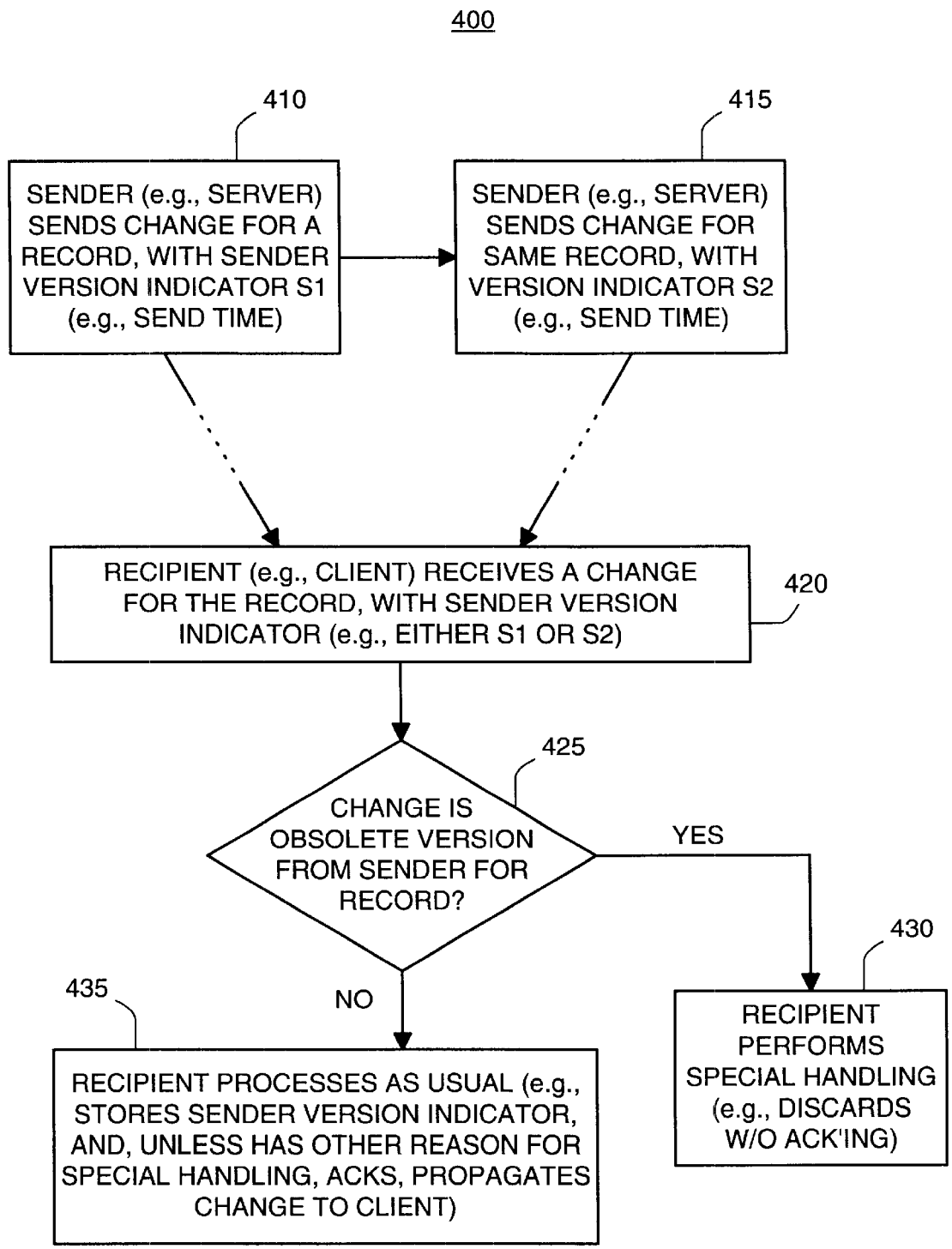
FIG. 4A is a flowchart that shows an efficient method for transferring and handling dataset changes during synchronization to prevent corruption of user data due to non-FIFO delivery of dataset changes, according to the preferred embodiment.

FIG. 4A is a flowchart that shows a method 400 for transferring and handling dataset changes during synchronization to handle non-FIFO delivery. The method 400 embodies the above-introduced preferred solution for ordinarily using changes received out of FIFO order, unless they were received out of FIFO order versus later-sent changes involving the same record, in which case they are specially handled (e.g., discarded). The method 400 is especially preferred if the communication medium involved (e.g., wireless or wireline) is susceptible to communication latency of greater than about a minute, or greater than about thirty minutes, or greater than about an hour, or greater than about three hours. The method 400 includes a step 410, in which the sender (e.g., the server) sends a change R1 that involves a record R in the sender and includes in the sending an indicator S1 of the version of the record R that is reflected in the change R1, e.g., an indicator S1 of send order. Preferably, the version indicator S1 is the change send time of the change R1 according to the sender's clock. Later, in a step 415, the sender sends a change R2 involving the same record R in the sender's dataset, and includes in the sending an indicator (e.g., send time) S2 of the version of the record R reflected in the change R2. Between the steps 410 and 415, the GUD record R may or may not have changed; i.e., the sent change R1 and R2 may or may not be different changes. A single send time may be sent as the version indicator for a group of changes that are considered to be sent at the same time. In an alternative embodiment, the modification time according to the sender's clock of each record is used as the record's version indicator, instead of the send time.

At some time after step 410 or step 415 or both, in a step 420, the recipient (e.g., client) receives a change (e.g., R1 or R2 ) along with a send version indicator (e.g., S1 or S2) for the received change. The received change corresponds to a record RR in the recipient's dataset. Next, in a step 425, the recipient compares the received send version indicator (e.g., R1 or R2) with a previously-received send version indicator (e.g., the other of R1 or R2) that the recipient has previously stored as a part of the status of the recipient record RR. If the received version indicator indicates a version that is no later than the previously-received version, then the received change is obsolete, and is subject to special handling in a step 430. Otherwise, the received change is not obsolete, and is subject to ordinary handling in a step 435.

Special handling in the step 430 preferably means that the recipient discards the received change, and will not acknowledge its correct receipt to the sender (e.g., if requested). Under ordinary handling in the step 435, the recipient stores the received sender version indicator as the recipient record RR's stored latest sender version indicator (for the particular sender) and, if the recipient finds no further reason to discard or otherwise specially handle the received change from the sender, then the recipient acknowledges receipt of the received change (e.g., when asked to acknowledge by the sender) and propagates the received change to the recipient's dataset in the ordinary way. Additional details underlying the steps of the method 400 will be discussed in later section(s).

3. Illustration of the Preferred Solution in a Synchronization Method

Figure 4B:
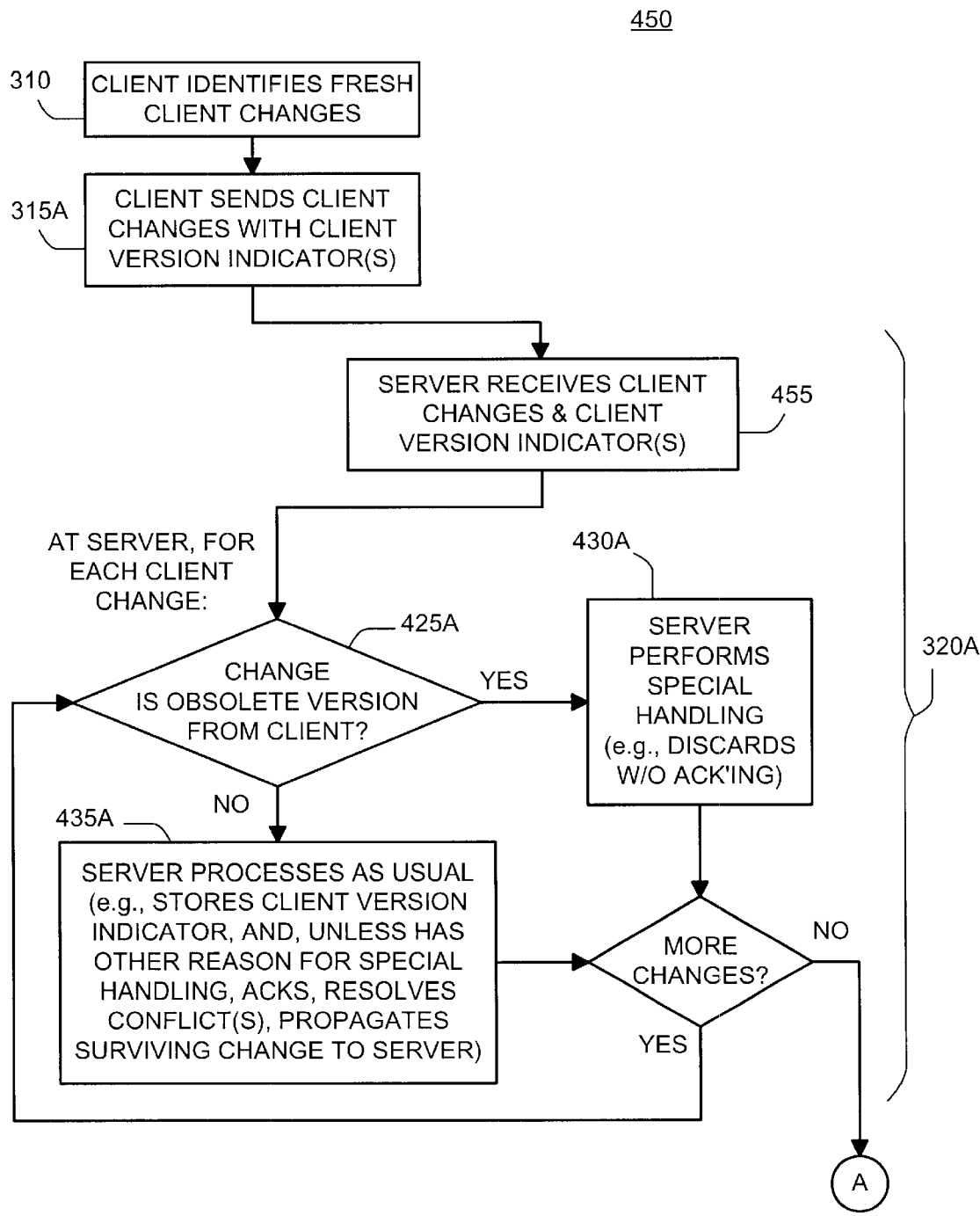
FIGS. 4B and 4C together are a flowchart that shows the synchronization method of FIG. 3 (which allows independent user changes during a (high-latency) synchronization) supplemented with the method of FIG. 4A (which handles non-FIFO delivery of dataset changes for synchronization).
Figure 4C:
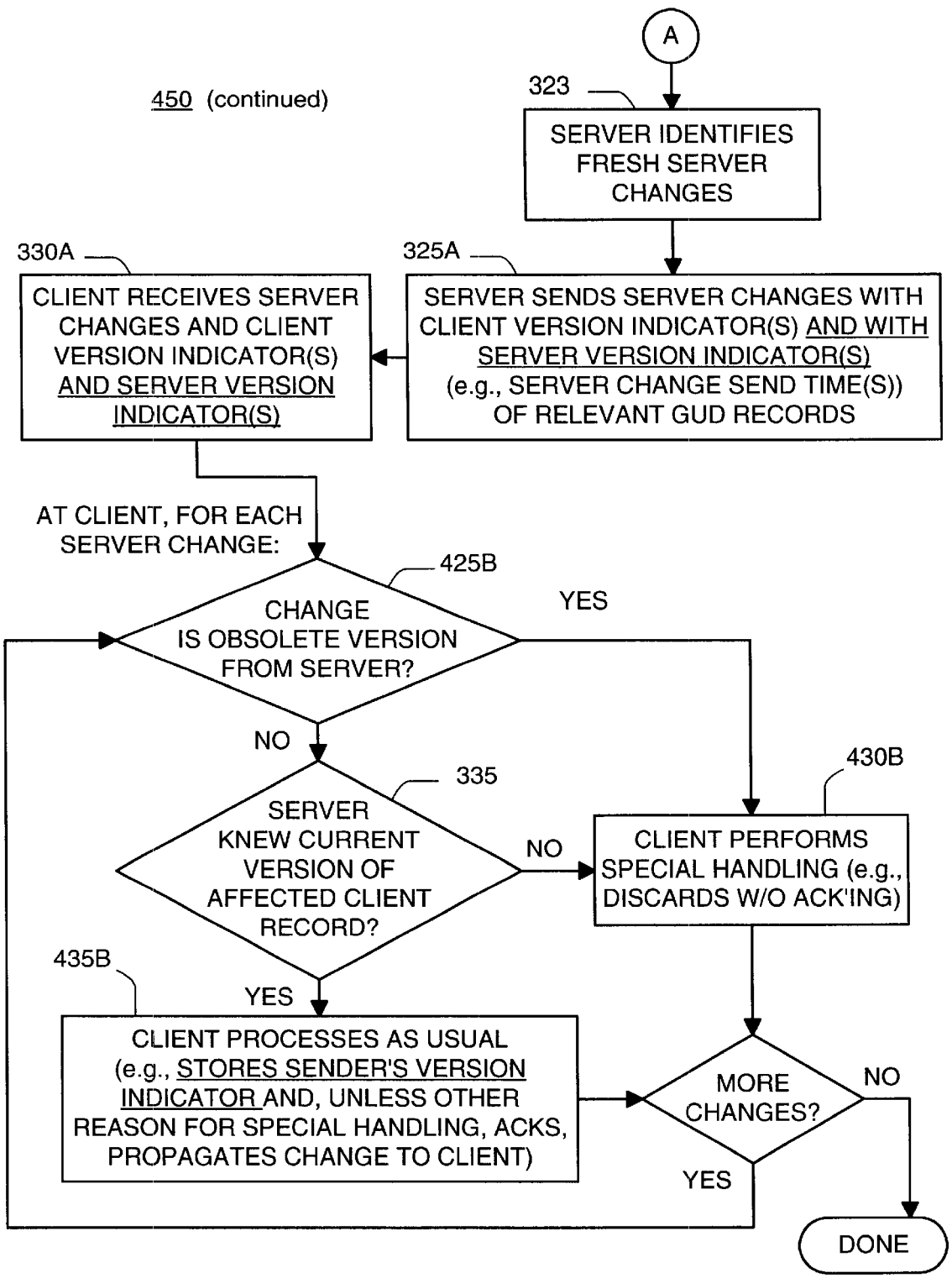

FIGS. 4B and 4C together are a flowchart that shows a synchronization method 450 according to the preferred embodiment. The method 450 is essentially the synchronization method of FIG. 3 (which handles received changes that affect fresh records, e.g., under high communication latency) supplemented and combined with the method of FIG. 4A (which handles dataset changes that may be delivered in non-FIFO order). Thus, the method 450 is especially preferred if the communication medium involved (e.g., wireless or wireline) is susceptible to communication latency of greater than about a minute, or greater than about thirty minutes, or greater than about an hour, or greater than about three hours. It's worth noting that the method 300 of FIG. 3 and the method 400 of FIG. 4A each uses for its own purpose version indicators associated with sent changes. The method 450 of FIGS. 4B and 4C preferably uses the same type of version indicator (namely, send times) both for the purpose of the method 300 and for the purpose of the method 400, as shown in FIGS. 4B and 4C, but is not restricted to using the same type of version indicator for both purposes.

As with the method 300 of FIG. 3, the method 450 that starts at FIG. 4B includes a step 310, in which the client identifies client record changes that are fresh versus the server. The step 310 is followed by a step 315A, in which the client sends these fresh client record changes and their client version indicator(s) (preferably, their send time(s)) to the server. In the step 315A, the client version indicator(s) are being sent both for the purpose of the method 300 and also for the purpose of the method 400. The step 315A is essentially the step 315 from FIG. 3, in the preferred embodiment. The server receives and processes these client changes in the step 320A.

The step 320A is essentially the step 320 from FIG. 3, supplemented and combined with the steps 425, 430, and 435 from FIG. 4A to handle client changes received in non-FIFO order. The step 320A includes sub-steps 455, 425A, 430A, and 435A. In the step 455, the server receives the client changes and their client version indicator(s). For each received client change, the server in a step 425A compares the received client version indicator with a highest previously-received version indicator from this client that the server has previously stored as a part of the status of the corresponding GUD record. If the received version indicator indicates a version that is no later than the previously-received version, then the received change is obsolete, and is subject to special handling in the step 430A. Otherwise, the received change is not obsolete, and is subject to ordinary handling in the step 435A.

Special handling in the step 430A preferably means that the server discards the received change, and will not acknowledge its correct receipt to the client (e.g., if requested). Under ordinary handling in the step 435A, the server acknowledges receipt of the client changes to the client (e.g., if asked) if no errors are encountered; performs conflict resolution on the received changes versus any changes in the GUD; propagates the client changes that survive conflict-resolution into the GUD; and stores in the GUD, for the GUD record corresponding to the client change, the version indicator of the client change, against which the GUD record is now conflict-free (e.g., conflict-resolved).

Note that the conflict resolution performed by the server in the step 435A preferably includes automatic, timestamp-based conflict resolution (e.g., latest change always wins) that involves comparison of timestamps from different clocks. If such conflict resolution were guaranteed to be always possible (e.g., all timestamps from all datasets are guaranteed to be convertible into a common time for correct, meaningful comparison), then the step 320A may optionally be replaced with the step 320 of the method 300 of FIG. 3. In general, the methods 900 and 950 may be operated, without requiring comparison of timestamps from different clocks and without requiring user input, independently of whatever conflict-resolution method is used. In particular, the version indicators stored in the steps 435, 435A, and 435B for a record are maintained, in anticipation of a next reception of a change for the record from the sender dataset, even after the record in the recipient dataset gets overwritten by values from a dataset other than the sender dataset (e.g., not due to synchronization with the sender dataset), should such an overwriting occur.

The method 450 continues at FIG. 4C. After the server has received and processed the client changes in the step 320A, it identifies GUD changes that are fresh versus the client in a step 323. The server sends the fresh GUD changes to the client in a step 325A and includes in the sending, for each GUD record, the client version indicator (similarly to the step 325 of the method 300) and also the server version indicator (similarly to the step 410 or 415 of the method 400). The step 325A essentially corresponds to the step 325 of the method 300 combined with the step 410 or 415 of the method 400.

In a step 330A, the client receives the GUD changes including the client version-indicator(s) of the GUD changes' last-known corresponding client records (similarly to the step 330 of the method 300) and also including the server version indicator (similarly to the step 420 of the method 400). The step 330A essentially corresponds to the step 330 of the method 300 combined with the step 420 of the method 400.

The client handles each received GUD change via some or all of steps 425B, 335, 430B, and 435B. In the step 425B, the client compares the received server version indicator for the each GUD change with a latest server version indicator that was previously received and stored by the client. If the received version indicator indicates a version that is no later than the latest server version previously received, then the received GUD change is obsolete, and is subject to special handling in the step 430B. Otherwise, the received GUD change is not made obsolete by a later-sent but earlier-received change from the server, and the client proceeds to the step 335. In the step 335, the client determines, from the client version indicator for the received GUD change, whether the GUD change is conflict-free from the server with respect to the current version, or an earlier version, of the corresponding client record. For example, if the corresponding client record has changed since the version indicated by the received version indicator, then the GUD change is conflict-free with respect to an earlier version of the client record. If this is the determination, then the GUD change is suspect and in the step 430B is subject to special handling. If not, then the GUD change is conflict-free (e.g., conflict-resolved) with respect to the current version of the client record, and the GUD change in the step 435B is subject to normal handling.

For simplicity, special handling in the step 430B preferably means that the client discards the GUD change, and will not acknowledge its correct receipt to the server (e.g., if asked). Under normal handling in the step 435B, if the client finds no further reason to discard or otherwise specially handle the received GUD change, then the client acknowledges receipt of the GUD change (e.g., if asked to), stores the received server version indicator as the latest server version indicator that has been received in connection with the GUD change's corresponding client record, and propagates the GUD change to the client dataset in its ordinary way. The step 430B essentially corresponds to the step 340 of the method 300 and also the step 430 of the method 400. The step 435B essentially corresponds to the step 345 of the method 300 combined with the step 435 of the method 400. Additional details underlying the steps of the method 450 will be discussed in later section(s).

C. Problem: Chatty Protocols Unfit for High-Latency Synchronization

1. Introduction: Characterizing Chattiness Using Concept of "Ply"

As has been discussed, chatty protocols, i.e., protocols that require numerous sequential communication exchanges, are unsuitable for use in synchronizing across communication environments having, e.g., high latency. To discuss the chattiness of synchronization protocols, the term "ply" will be used. The concept of "ply", as introduced in this document, is used to characterize the chattiness of any conversation or exchange of messages between two parties. For example, consider a scripted dramatic dialog between two actors in which only one actor speaks at a time. Each uninterrupted set of utterances by one actor forms a "ply", and the script for the dialog can be characterized as an "N-ply" script. For another example, consider an exchange of letters between two parties, Albert and Betty, by mail. Suppose Albert and Betty each has an agenda, or algorithm, for the overall exchange of letters. For example, Albert's algorithm might be: A1) I will send a letter describing my vacation and asking about Betty's vacation; A2) I will send a letter describing my favorite food; and A3) If Betty replies that her vacation was spent in California, then I will send a letter describing my childhood spent in California. Betty's algorithm might be: B1) I will await a query from Albert and send a letter replying to that query; and B2) I will send a letter describing my first automobile. The algorithms for Albert and Betty can completely "finish" most quickly if the letters of A1, A2 and B2 are sent immediately, to constitute a first ply; the letter of B1 is sent after receipt of the letter of A1, to constitute a second ply; and the letter of A3 is sent after receipt of the letter of B1, to constitute a third ply (assuming that Betty's vacation was spent in California). Thus, the letter-writing algorithm for Albert and Betty is a three-ply algorithm.

Speaking more generally, the set of synchronization messages needed to conduct a synchronization according to a synchronization protocol/algorithm may be grouped into a sequence of plies. Each ply is a group of messages having the following defined property: once all messages in a ply in the sequence have been fully received and processed, then (assuming there are no errors) there is no further restriction that prevents any message of the immediately next ply in the sequence from being sent. Thus, if all synchronization messages in a ply of an N-ply protocol are modeled as being sent simultaneously and processed by the communication network simultaneously, then the communication network contributes only about N transmission latencies of delay to the synchronization (one respective transmission latency per ply), assuming that no errors occur.

2. Constant-Ply Solution Reduces Chattiness And Maintains Reliability

Prior synchronization schemes that requires each record to be individually requested and sent via a communication network can require an unlimited number of plies, e.g., more than thousands or tens of thousands of plies, depending on the number of records being synchronized. In contrast, synchronization methods of the present invention do not require numerous sequential communication exchanges— i.e., do not require numerous plies. Generally, synchronization methods of the present invention allow merely a constant number of plies to be used for synchronization for any amount of data to be synchronized, assuming no errors. In any event, the number of plies needed for synchronization according to the present invention needs not grow linearly with the number of data records being synchronized, in contrast to synchronization methods that requires each record to be individually requested/transmitted in sequence across a communication medium. Significantly, even if errors (e.g., communication errors) do occur, synchronization methods of the present invention can still maintain proper state, avoid loss of data, recover, and determine and optionally convey to the user the current state of synchronization. The constant-ply methods of the present invention are especially preferred if the communication medium involved is susceptible to communication latency of greater than about a minute, or greater than about thirty minutes, or greater than about an hour, or greater than about three hours.

3. The Six-Ply Solution

Figure 5A:
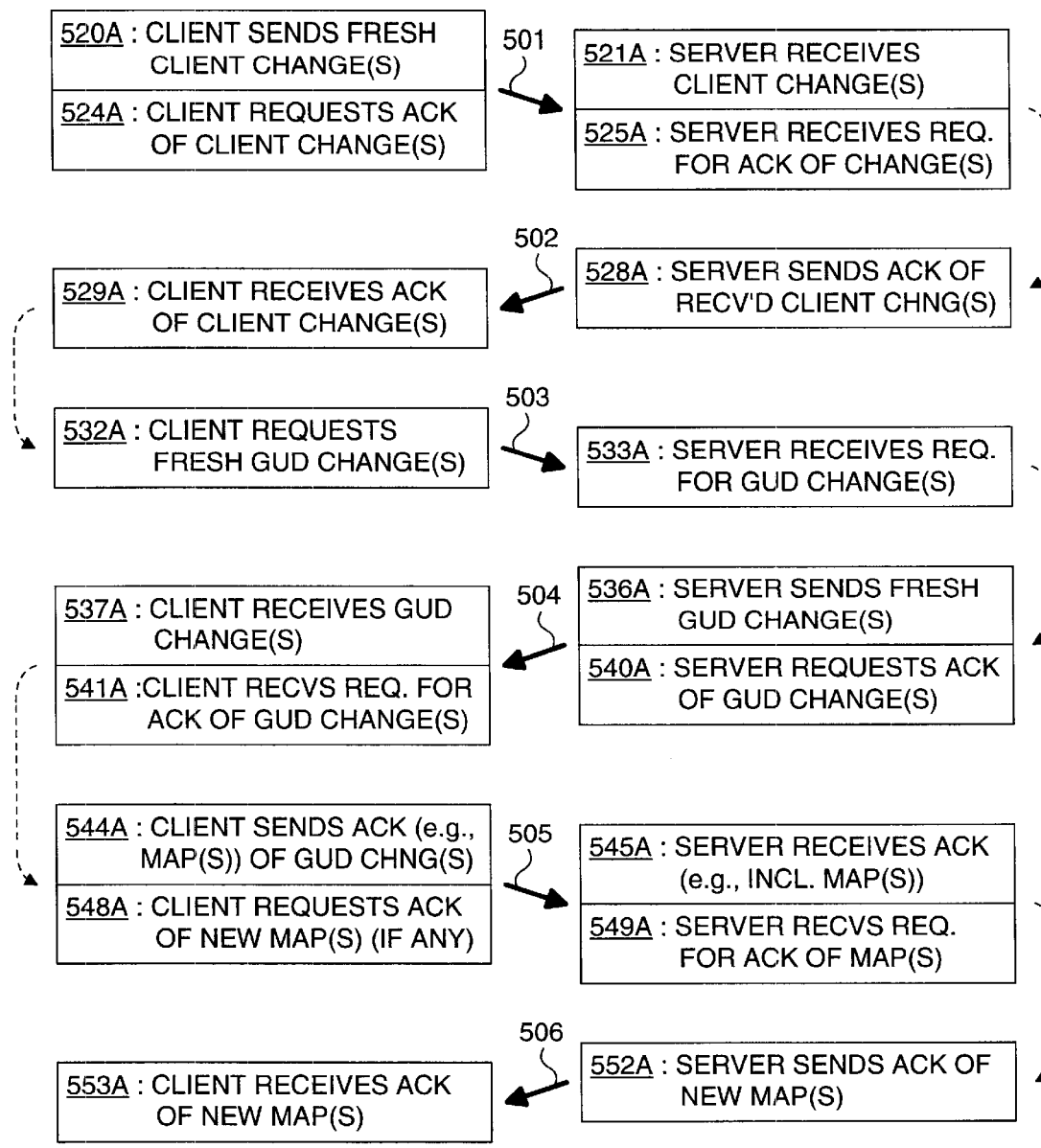
FIG. 5A is a flowchart that shows a "low-chattiness", "six-ply" synchronization method according to an embodiment of the present invention.

FIG. 5A is a diagram that depicts the communication between a client and the server for a six-ply synchronization method 500 according to the present invention. The six-ply synchronization method 500 includes six plies (groups) 501–506 of synchronization communications in sequence. Each of the six sequential plies 501–506 is shown in FIG. 5A with an arrow (from which the labels "501"–"506" extend) that represents the transmission of a set of messages for the ply (and therefore represents transmission latency for the ply).

In one embodiment, each ply of communications is sent as a single (perhaps large) message (e.g., e-mail or pager message). In such an embodiment, each ply is not sent until the entire previous ply is received. If one side of the synchronization sends a ply of communications that requires a reply, but does not receive a responding ply of communications, then the side would re-send its entire ply. In another, preferred embodiment, the communications within each ply are sent individually, and preferably in order (top to bottom in FIG. 5A). Ideally, all such communications arrive at the intended recipient and in FIFO order, and the recipient processes communications, in order, as soon as they are received. However, the beauty of the present invention is that, in part because of the robustness and flexibility of the synchronization protocol (further described in later sections) according to the present invention, even if some communications get lost or arrive out of FIFO-order, the communications that do arrive are processed, if possible, and all sides (e.g., both sides) of the synchronization maintain proper state without permanently losing data. Sending communications of a ply individually has advantages, such as the advantage that small messages are less susceptible than large messages to transmission failure in wireless paging and other communication mediums.

In the first ply 501, the client sends 520A client record change(s) (e.g., additions, modifications, deletions) to the server. The client also sends 524A request(s) for acknowledgment of receipt of the sent client record change(s). The server receives (521A, 525A, respectively) the client record change(s) and the request(s) for acknowledgment of the client record change(s).

In the second ply 502, the server responds by sending 528A acknowledgment(s) of received client record change (s) to the server. The client receives 529A the acknowledgment(s).

In the third ply 503, the client sends 532A a request for the server's (GUD's) fresh record change(s) to the server. The server receives 533A the request.

In the fourth ply 504, the server responds by sending 536A GUD record change(s) (e.g., additions, modifications, deletes) to the client. The server also sends 540A request(s) for acknowledgment of receipt of the sent GUD record change(s). The client receives (537A, 541A, respectively) the GUD record change(s) and the request(s) for acknowledgment of the GUD record change(s).

In the fifth ply 505, the client responds by sending 544A acknowledgment(s) of received GUD record change(s) to the server. If the received GUD record change(s) include record addition(s), the sent acknowledgment(s) would include new record mapping(s), e.g., client record ID(s), for client record(s) that were newly added in response to the received GUD addition(s). If the acknowledgment(s) include new record mapping(s), the client sends 548A request(s) for acknowledgment of receipt of the sent new record mapping(s). The server receives (545A, 549A, respectively) the acknowledgment(s), including any new record mapping(s), and any request(s) for acknowledgment of the new record mapping(s).

In the sixth ply 506, the server responds by sending 552A acknowledgment(s) of received new record mapping(s) to the server. The client receives 553A the acknowledgment(s).

4. The Four-Ply Solution

Figure 5B:
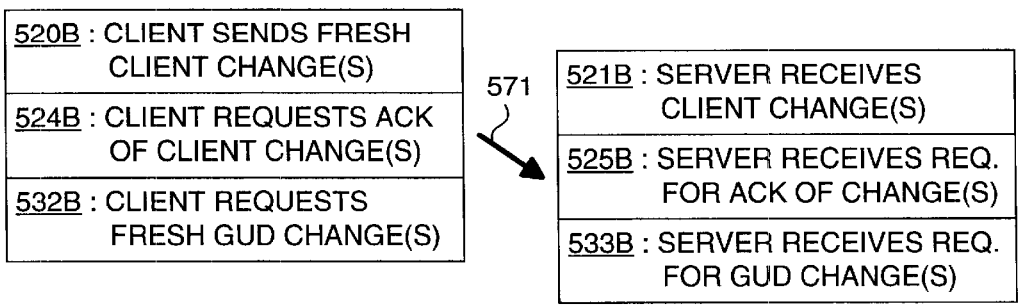
FIG. 5B is a flowchart that shows a low-chattiness, "four-ply" synchronization method according to an embodiment of the present invention.
Figure 5B:
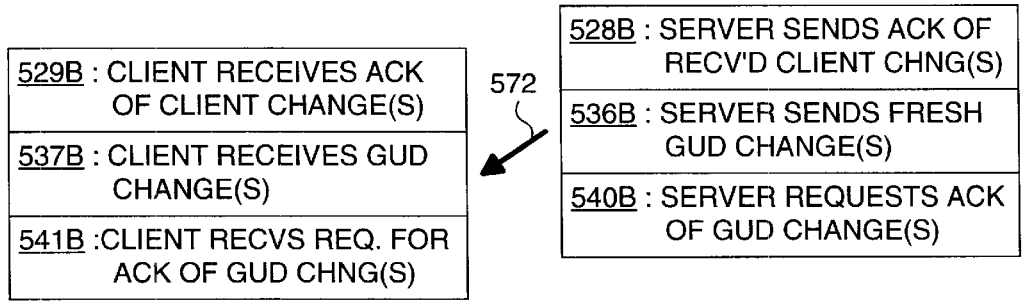
Figure 5B:
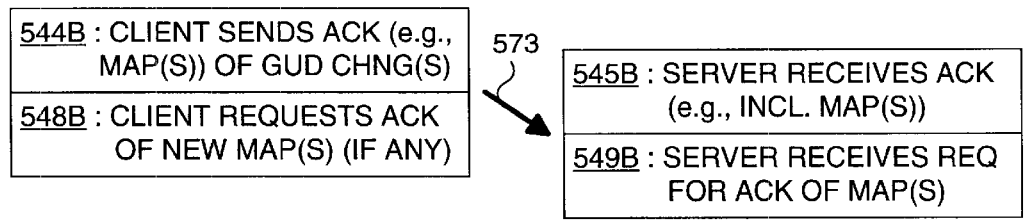
Figure 5B:

FIG. 5B is a diagram that depicts the communication between a client and the server for a four-ply synchronization method 570, according to the present invention, that includes four plies 571–574 of synchronization communications. The four-ply synchronization method 570 resembles the six-ply synchronization method 500 of FIG. 5A, and the steps of FIG. 5B are numbered similarly to similar steps in FIG. 5B. As with the six-ply method 500 of FIG. 5A each ply of communications may be sent as a single (perhaps large) message (e.g., e-mail or pager message), or the communications within each ply are sent individually, and preferably in order (top to bottom in FIG. 5B).

The four-ply method 570 performs a full synchronization using only four plies of communications. In the first ply 571, the client sends 520B client record change(s) (e.g., additions, modifications, deletes) to the server. The client also sends 524B request(s) for acknowledgment of receipt of the sent client record change(s). The client also sends 532B a request for the server's (GUD's) fresh record change(s) to the server. The server receives (521B, 525B, and 533B, respectively) the client record change(s), the request(s) for acknowledgment of the client record change(s), and the request for the server's fresh record change(s).

In the second ply 572, the server responds to the request of the step 524B by sending 528B acknowledgment(s) of received client record change(s) to the server. The server also responds to the request of step 533B by sending 536B GUD record change(s) (e.g., additions, modifications, deletes) to the client. The server also sends 540B request(s) for acknowledgment of receipt of the sent GUD record change(s). The client receives (529B, 537B, and 541B, respectively) the acknowledgment(s) of received client change(s), the GUD record change(s), and the request(s) for acknowledgment of the GUD record change(s).

The third and fourth plies 573 and 574 resemble the fifth and sixth plies 505 and 506 of the method 500 of FIG. 5A and need not be laboriously described again.

5. The Nominally-Two-Ply Solution

Figure 5C:
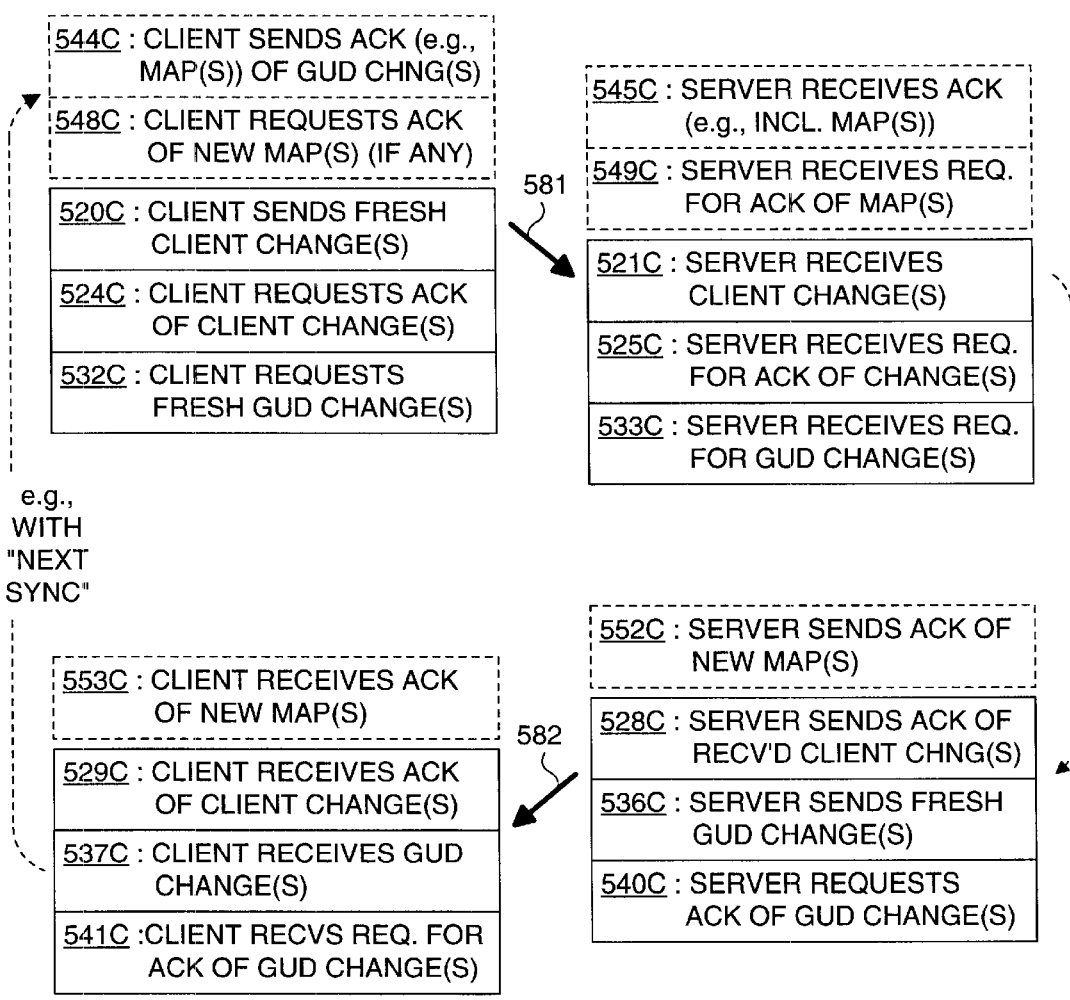
FIG. 5C is a flowchart that shows a low-chattiness, nominally "two-ply" synchronization method according to an embodiment of the present invention.

FIG. 5C is a diagram that depicts the communication between a client and the server for a nominally two-ply synchronization method 580 according to the present invention. The nominally two-ply synchronization method 580 includes two plies 581 and 582 of synchronization communications in sequence. The two-ply synchronization method 580 resembles the four-ply synchronization method 570 of FIG. 5B, and the steps of the two-ply method of FIG. 5C are numbered similarly to similar steps in FIG. 5B.

The nominally two-ply synchronization method 580 differs from the four-ply synchronization method 570 in that the last two plies 573 and 574 of one synchronization are combined with the first two plies 571 and 572, respectively, of a next synchronization, to form the nominally two-ply synchronization method 580. This is a form of pipelining the four-ply synchronization method 570 to provide higher synchronization throughput. Put another way, this is a way of starting a new synchronization before the previous synchronization has fully ended, i.e., before all exchanged records of the previous synchronization have been fully mapped to each other in the server's internal database. The nominally two-ply synchronization method 580 can be advantageously employed to repeatedly synchronize (e.g., perpetually synchronize) a dataset that undergoes frequent changes. For example, a client may be programmed to check for fresh client changes or acknowledgment requests (e.g., requests for mappings) according to a user-settable schedule (e.g., every N minutes, where N is user-settable and defaults, e.g., to a number between five and thirty), and if such fresh changes or requested acknowledgments are found, the client initiates the method 580 by sending the transmissions of the first ply 581. For another example, a client may be programmed to initiate the method 580 as soon as it detects that the server has become reachable via the communication medium, e.g., as soon as the server has come into transmission range, or e.g., as soon as the server has "logged on" to the communicataion medium.

D. Allowing Flexible (e.g., Partial) and Asynchronous Synchronization

Synchronization methods according to an embodiment of the present invention include flexibly performing synchronization transactions at will (e.g., at the user's discretion) outside the context of a full, two-phased synchronization in which dataset(s) being synchronized are locked against user changes during synchronization. For example, the user's wireless (client) device includes a simple "send changes" command (e.g., a button), that when invoked by the user, sends all fresh client changes (or only fresh changes involving a set of user-selected records) to the server, without invoking return changes from the server. (Changes in a client dataset are fresh with respect to the server if, for example, they include values or status, e.g., "deleted", that the server may not have seen before.) For another example, the client device includes a simple "get changes" command (e.g., a button) that, when invoked by the user, requests all fresh GUD changes (or only fresh changes involving a set of user-selected records) from the server, without first requiring that all fresh client changes have already been sent to the server. (Changes in the server dataset are fresh with respect to a client if, for example, they include values or status, e.g., "deleted", that the client may not have seen before.)

Further, these free-form transactions are performed without needing to lock the client dataset against user modification for any user-appreciable lengths of time (; e.g., any processing delays are much shorter than the maximum possible transmission latency encountered by synchronization signals.) Still further, these free-form transactions are performed even if the client is a simple one that does not ordinarily perform conflict resolution locally but relies on the server to provide conflict resolution. These free form transactions may be controlled by user input to the synchronization system (e.g., to the server or to a client accessor) for initiating synchronization. The user input may specify transactions (e.g., "send changes", "get changes", "synchronize") either for immediate execution or for timed execution (e.g., "synchronize at 2:00am"). Such free-form transactions may be implemented for example by freely undertaking the "plies" of transmissions in the methods 500, 570, or 580 in an asynchronous or connectionless manner.

E. Sent Changes/Signals Get Lost: A Non-Chatty Solution is Provided

During the synchronization process, dataset changes and other signals are sent between a client (dataset accessor) and the server (synchronizer core). As is described elsewhere in this document, these changes/signals may be sent in multiple batches. Due to the limitations of the communication system used, some batches may get lost. A solution to this problem according to the present invention involves seeking acknowledgment from the other side for sent (batches of) changes/signals. However, in a high-latency environment, it is not desirable to await acknowledgment of each batch before sending the next batch. Therefore, as is further explained elsewhere in this document, preferred synchronization methods according to the present invention ensure robustness against lost changes/signals by using acknowledgments, but do not generally require a linear, in-sequence confirmation of each batch of communications before other synchronization communications can be sent or processed. Rather, a (less-chatty) asynchronous, pipelined communication/synchronization scheme is used, in which robustness against lost changes/signals is still maintained. The methods 500, 570, and 580 embody this design approach.

F. Single Framework for Various Synchronization Styles

As has been mentioned, the present invention permits and includes in its embodiments a variety of synchronization methods of various styles or modalities (e.g., partial, six-ply, four-ply, nominally-two-ply, and the like). These different methods may be chosen according to the particular circumstances and needs for a given synchronization or synchronization client. According to the present invention, a single, highly-flexible synchronization protocol framework (including, e.g., "action objects", which will be further discussed) is used to realize the various synchronization methods, as will be further described in later sections. For example, the methods of FIGS. 3, 4 A–C, and 5 A–C are all preferably implemented using a same underlying synchronization protocol framework (e.g., "action objects"), as will be further described, according to the present invention.

G. Hiding Complexity from Clients, As Appropriate For Clients' Capabilities

The present invention is capable of largely confining complexity into the synchronization engine and away from the client's side of the communication channel under certain conditions. Such a capability is helpful if very simple client datasets are to be supported. In particular, the conflict-resolution (including duplicate-resolution) task is preferably confined if and when possible to the synchronizer core because the synchronizer core can devote substantial resources (e.g., field-based priorities, other extensive status information, processing power, and the like, etc.) to the task. Under this preferred division of labor, the client generally receives changes that are known to be conflict-resolved with respect to a previous state of the client. Depending on the capabilities, limitations, or needs of particular client datasets, however, the present invention may allow functionality such as conflict resolution to be delegated to the client's side of the communication channel, but preferably with assistance or supervision from the synchronizer core, as will be further described below.

IV. A More Detailed Discussion: Re-Introduction to Synchronization

A. Datasets, Records, and Synchronization

Datasets are collections of data. According to the present invention, the purpose of synchronizing two, or more than two, datasets is to update them as necessary with data from one another so that they contain the same or equivalent data (generally, the latest data), at least in the portions of the datasets that the user has designated for synchronization. Each dataset may be organized into individual data records. For example, a dataset having contact information may be organized into records, including a record listing a "Bill Smith's" phone numbers and addresses and another record listing a "Ted Brown's" phone numbers and addresses. In general, if records have been added to any dataset before a synchronization, then equivalent records are added to the other datasets as a result of the synchronization. Also, generally, if modifications or deletions of records have been made to one dataset before the synchronization, then equivalent modifications and deletions of corresponding records are made to the other datasets as a result of the synchronization. (The preceding discussion of synchronization according to the present invention becomes more complicated if conflicts or duplicates are present. Conflicts and duplicates are further described in later sections.)

B. Record Files, Data Types, Data Fields, etc.

In synchronizing two, or more than two, datasets, a correspondence is generally established between particular records across the datasets. For example, a contact record for "Bob Smith, of Acme Widgets" may exist in every dataset (perhaps as a result of synchronization), and these records in different datasets may correspond to one another. The records in a dataset may be of various data types, for example, a time-zone type, a contact type, a calendar-entry type, a task (or "to do" -list-entry) type, a memo type, an electronic-mail type, or other types. In general, each record may include data organized into one or more data fields. For example, a contact-type record may include data for a "last name" field, a "first name" field, a "company" field, and many other fields. For many typical data types, it is not necessary for each record of the data type to have data for every possible field. For synchronization, a correspondence is typically established between particular data fields across datasets. For example, a "title" field for contact records in one dataset may correspond to a "Job Title" field for contact records in another dataset. In general, the systems and methodologies of the present invention can be adapted to work with any one type of data, or with any multiple types of data, and with arbitrarily defined or named data fields.

Within a dataset, the records of a particular data type may further be organized into one or more groups that are here referred to as record files. Examples of record files include "Cardfiles" in Starfish's Sidekick® PIM or "folders" in Microsoft's Outlook PIM. A preferred embodiment of the invention allows the user to specify an arbitrary correspondence, or mapping, of particular record files of the same data type in different datasets to each other. For example, the user may specify that a record file named "Business Contacts" in a first dataset, a record file named "Contacts" in a second dataset, and a record file named "Customer List" in a third dataset be mapped to one another. Separately, the user may specify that only a record file named "Calendar" in the first dataset and a record file also named "Calendar" in the third dataset be mapped to each other. As demonstrated by the preceding example, a user-specified synchronization of multiple datasets by the preferred embodiment may include a number of separate synchronizations, each of which synchronizes a set of mutually-mapped, or corresponding, record files. Each synchronization of corresponding record files does not necessarily involve all of the multiple datasets. Each synchronization of corresponding record files also need not necessarily involve the same datasets as other synchronizations of other record files. For simplicity only, unless otherwise stated or unless context demands otherwise, discussion of synchronizing datasets may use language as if to assume that all datasets involved in the synchronization each contains exactly one record file that is mapped to the one record file of all other datasets involved. It is to be understood that this simplification, and other simplifications made for ease of description, are not meant to limit the scope of the invention.

C. Record Transformations

When performing synchronization, a synchronization system transforms records from one dataset's representation into another dataset's representation. For example, the system may transform from an Internet Sidekick® cardfile for business contacts into a synchronization-system-internal representation. Typically, there is a one-to-one relationship between records in the source and target datasets. If this is not the case, however, the component of the system that interacts with a non-conforming dataset (e.g., a dataset accessor) includes logic to handle this non-conformity.

D. Field Mapping Types and Field Conversion Types

Record transformations are a combination of field mappings and conversions from a source record to a target record. It is often the case that there are significant differences in the number, size, type and usage of fields between two datasets in a synchronization relationship. The specification of transformations generally depends on the particular datasets involved, and may be user configurable, with the synchronization system providing defaults.

In a specific embodiment, the following types of field mappings are supported.

| | |
|---|---|
| 1. Null | Source field has no equivalent field in the target dataset and is ignored during synchronization. |
| 2. One-to-One | Map exactly one field in the target to one field in the source. |
| 3. One-to-Many | Map one field in the target to many fields in the source, such as parse a single address line to fields for number, direction, street, suite/apartment, or the like. |
| 4. Many-to-One | Map several fields in the target to one field in the source, such as reverse the address line mapping above. |

The following types of field conversions are supported.

| | |
|---|---|
| 1. Size | Source field may be larger or smaller in size than the target field. |
| 2. Type | Data types may be different, such as float/integer, character vs. numeric dates, or the like. |
| 3. Discrete Values | A field's values may be limited to a known set. These sets may be different from target to source and may be user defined. |

E. Conflicts and Duplicate Records

In general, the user may make arbitrary changes to individual datasets and later synchronize the datasets. In general, each change made to a dataset (for example, addition, modification, or deletion of a record) by its user is propagated to other datasets as a result of a subsequent synchronization. However, it sometimes happens that two, or more than two, changes are in conflict with one another such that the changes cannot all be propagated without one change's undoing or otherwise interfering with another. Such changes give rise to a "conflict." For example, a conflict exists when a user has made a modification to a record in a first dataset, and has separately made a conflicting modification to the record's corresponding record in a second dataset. For a specific example, the user may have set a contact's (e.g., Bob Smith's) "title" field to "salesperson" in his handheld organizer device and separately set the corresponding contact's (Bob Smith's) "title" field to "Sales Manager" on the user's desktop PIM. Automatic and user-assisted methods for resolving conflicts according to the present invention are discussed in later sections.

Occasionally, the user may cause the same, or matching, information to exist in different datasets without using the present invention, and then use the present invention to synchronize the datasets. For example, the user may cause records to exist for a "Bob Smith, of Acme Widgets" in multiple datasets, either by adding such records or by modifying existing records into such records. If the definition of the contact data type requires that the first name, last name, and company information for each contact be unique, then the example records would by definition match one another. In such a situation, simpleminded propagation of each added or modified record in each dataset to all other datasets would result in a duplication of records. Therefore, the present invention performs duplicate resolution to prevent such duplication. Automatic and user-assisted methods for resolving duplicates according to the present invention are discussed in later sections. Preferably, logic for performing duplicate or conflict resolution is confined as much as possible to the synchronization system's core and not at the client datasets' accessor.

F. Timestamps

The present invention often will make processing decisions based on comparing the time at which past events occurred. For example, the system may want to know whether a record in a dataset was modified before or after a most recent synchronization. Therefore, the time of various events should be recorded. One or more "timestamp" values in record fields are dedicated to this purpose. Typically, datasets involved in synchronization can be assumed to support a "last-modification-time" timestamp. Datasets that do not have timestamps, however, can still be synchronized using the present invention, but may require more processing by the present invention (for example, to perform exhaustive record comparisons) or more intervention by the user (for example, during conflict resolution).

In conjunction with the use of timestamps to compare the relative timing of record creation, modification, synchronization, or the like, the clocks on the datasets' respective devices may themselves be kept synchronized, or assumed to be synchronized, either to the same value, or to equivalent values, or to values having a constant offset. Equivalent clock values include clock values plus clock time-zone information showing that the clock values correspond to a common time, for example a common Greenwich Mean Time (GMT) (i.e., time according to the GMT time zone). Clock values having a constant offset to one another may exist for example if devices that do not include time zone information have clocks set for different time zones. Clock values having a constant offset may also exist if two devices do not have their clocks synchronized, and the user does not wish to, or cannot, synchronize them. For example, the clocks on a server computer and a local computer may not be synchronized, and the user may be unable to reset the server clock, even though it is off by, for example, five minutes. In specific situations, the present invention will work directly with timestamps from the clock of a particular dataset's device without first converting such timestamps to a common time such as time according to the synchronization system's own clock or GMT. This is done, when possible, to minimize problems due to any relative drift in the devices' clocks, such as drifts caused by clock inaccuracies or drifts caused by the user's re-setting of a clock on a device. Comparison of timestamps is further discussed elsewhere, for example in the incorporated U.S. patent application having Ser. No. 09/136,215 and elsewhere in this document.

Some information devices may be so simple as not to have real-time clocks (having time and date) at all. Datasets in some of such devices and other devices, instead, use simple counters as their (non-real-time) clocks. Such counters are incremented either continually at unspecified and possibly non-constant rates or upon the occurrence of particular activities or events. For example, the counter may be incremented whenever any record is changed in the dataset (such that the counter counts changes). Counter values may be suitable for use as timestamps (e.g., last-modification timestamps) for the dataset, especially if the counters are guaranteed to increase between one change to any record within the dataset and any subsequent change to any record within the dataset. However, such timestamps for the dataset cannot readily be converted into a real time (e.g., GMT time and date) and therefore cannot readily be compared with timestamps (e.g., real-time timestamps) from other datasets (and therefore are not globally-usable). Synchronization schemes according to embodiments of the present invention will work with even such datasets. In particular, the synchronizer, and especially the client accessor, does not need to compare timestamps from such a client dataset's clock with timestamps from another clock, such as the reference dataset's clock. For data from such datasets, however, timestamp-based automatic conflict resolution (e.g., "latest change wins") may not be possible, as will be described. Regardless, even for client datasets with real-time clocks that produce globally-usable timestamps, comparison between timestamps from different devices can be problematic due to time-drift and other issues, and when needed are preferably confined to the synchronization system's core. Preferably, all client datasets do have and use real-time clocks that provide globally-usable timestamps (e.g., convertible into GMT). Most especially, the synchronizer core (including the reference dataset) preferably has and uses a real-time clock that provides globally-usable (e.g., convertible into GMT) timestamps for the core's records and operations.

V. A More Detailed Discussion: The Synchronization System

A. System Architecture

Figure 6:
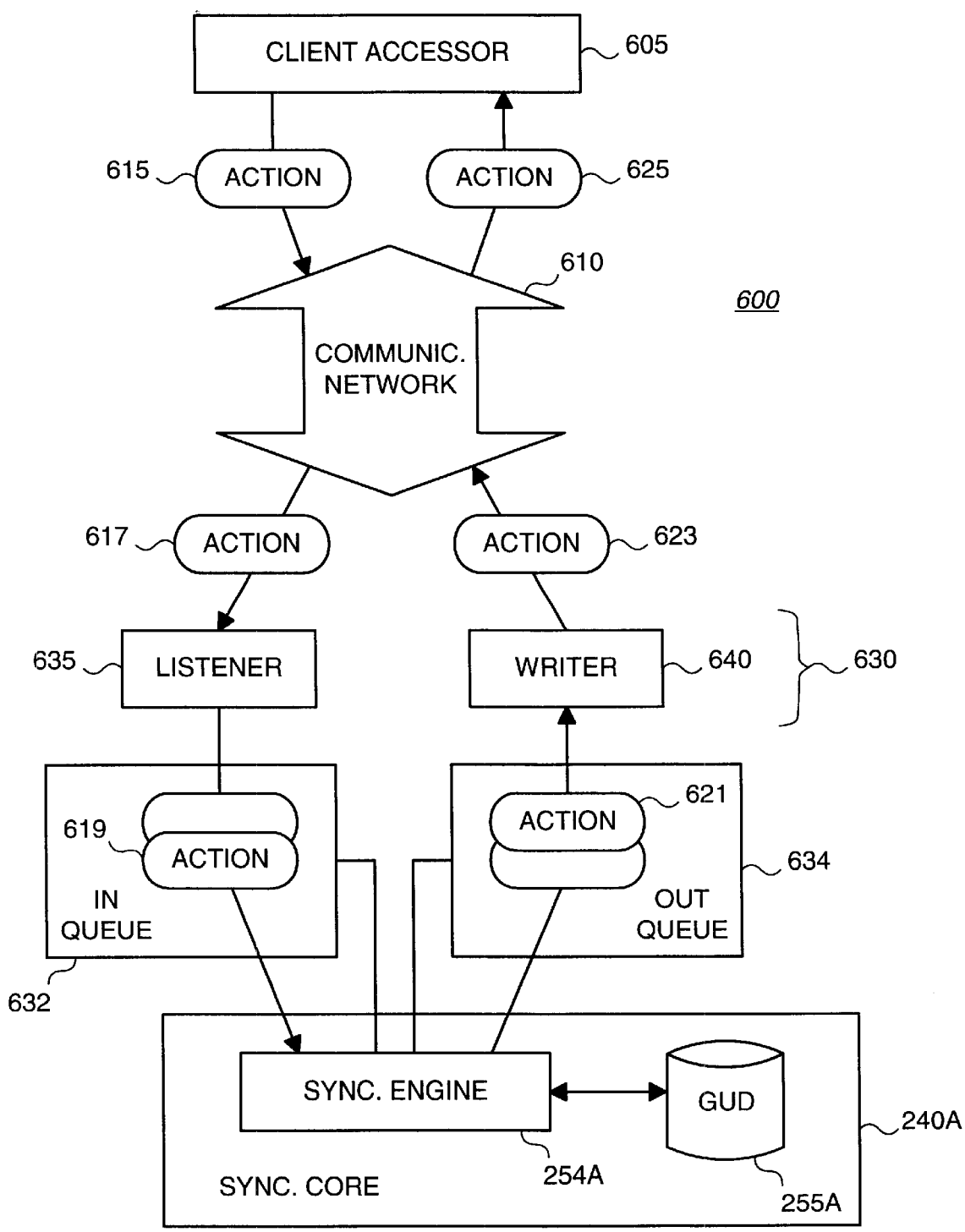
FIG. 6 is a block diagram that shows the architecture of a synchronizer according to the preferred embodiment.

FIG. 6 is a block diagram that shows the architecture of a synchronizer 600 according to an embodiment of the invention. The synchronizer 600 includes a client accessor 605 and a synchronizer core 240A which communicate with each other by exchanging messages called "action objects" 615, 617, 619, 621, 623, and 625 via a communication network 610 that is found in the environment of the synchronizer and via a communication layer 630 and input queue 632 and output queue 634. In the preferred embodiment, the synchronizer 600 includes a synchronization server, capable of wireless- and Internet-based communication, on which the synchronizer core 240A is implemented.

The communication network 610 may include wireless or wireline networks for providing point-to-point, real-time connections (e.g., sockets, full- or half-duplex connections, and the like, etc.) and/or wireless or wireline networks for transferring messages (e.g., paging messages or e-mails). Examples of suitable communication networks include GSM networks (Global System for Mobile Communications), PCS networks (Personal Communication Services), TDMA (Time-Division Multiple Access) networks, CDMA (Code-Division Multiple Access) networks, wireless paging networks, AMPS (Advanced Mobile Phone System) networks, CDPD networks (Cellular Digital Packet Data), POTS networks (Plain-Old-Telephone-Service), the Internet, other IP-based (Internet-Protocol) or TCP/IP-based (Transmission Control Protocol/IP) networks, networks supporting SMS (Short Messaging Service), networks supporting WAP (Wireless Application Protocol) or HDTP (Handheld Device Transport Protocol), other cellular networks, other paging networks, other digital or analog wireless networks, other wireline networks, other circuit- or packet-based networks, and like networks. (WAP specifications are available for free download on the Internet at http://www.wapforum.com/docs/technical.htm.)

The client accessor 605 handles access to information in a particular client dataset (not shown) and handles delivery and receipt of information across the communication channel 610 on the client side. The communication layer 630 handles delivery and receipt of information across the channel 610 on the synchronizer core's side. The communication layer 630 includes a listener 635 for receiving and unpackaging (e.g., de-serializing) information from the communication channel 610 into an input queue 632. The communication layer 630 also includes a writer 640 for packaging (e.g., serializing) and sending information onto the communication channel 610 from the output queue 634.

The synchronizer core 240A includes a GUD 255A that stores a super-set of information from all other datasets as a central repository of information, including not only the latest, conflict-resolved values of data records but also status information, including the correspondence, or mapping, of records in the GUD to records in other datasets. The synchronizer core also includes a synchronizer engine 254A that controls and maintains the GUD and works with all client accessor(s) to collectively drive and control the synchronization process. The Synchronization engine works with client accessor(s) by receiving action objects via the input queue and sending action objects via the output queue.

Preferably, the client accessor 605 exists as a software process that runs on a same device as the particular client dataset. Preferably, the listener 635 and the writer 640 exist as individual software processes that respectively replenish and withdraw action objects from the in queue and out queue, respectively, when available. The action objects 619, 621, 615, and 625 that are used by the synchronizer core 240A and the accessor 605 for mutual communicating will be further described in a later section. For now, it is sufficient to mention that action objects are a defined format for conveying dataset changes and other information between the synchronizer core and client accessors, in either direction. The action objects 615, 617, 623, and 625 are action objects that have been packaged (for example, serialized) for transport across the communication channel 610.

B. The Reference Dataset (GUD)

Figure 7A:
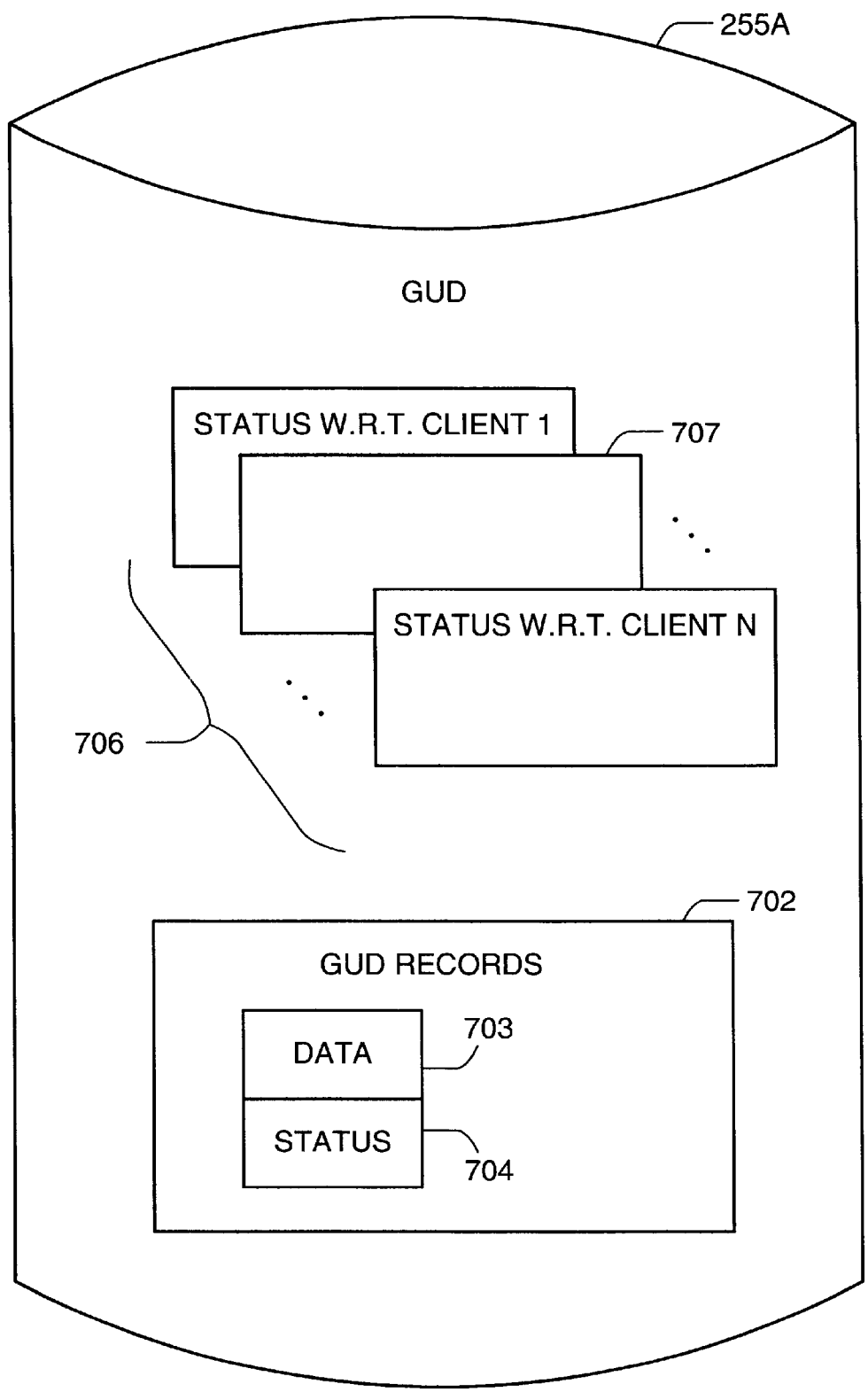
FIG. 7A is a block diagram that shows the synchronizer's reference dataset ("GUD") according to the preferred embodiment.

FIG. 7A is a block diagram that shows components of the Reference dataset, or GUD 255A according to a preferred embodiment. As shown, the GUD includes stored GUD records 702. These GUD records correspond to the most up-to-date, conflict-resolved records processed by the synchronizer during any synchronization since the GUD was created or last reset. The GUD records 702 include data 703 corresponding to data in client records and status information 704 about the GUD records 702. In addition, the GUD includes status information 706 about records in the clients. In particular, the client status information 706 includes information about all records last known by the synchronizer to be in the clients and to correspond to GUD records. Preferably, the client status information 706 is organized as independent "mapping tables" (for example, a mapping table 707) that each includes information relating to all records last known to be in a particular client that correspond to (e.g., are mapped to) the GUD records.

1. GUD Records, Including Their Status

Figure 7B:
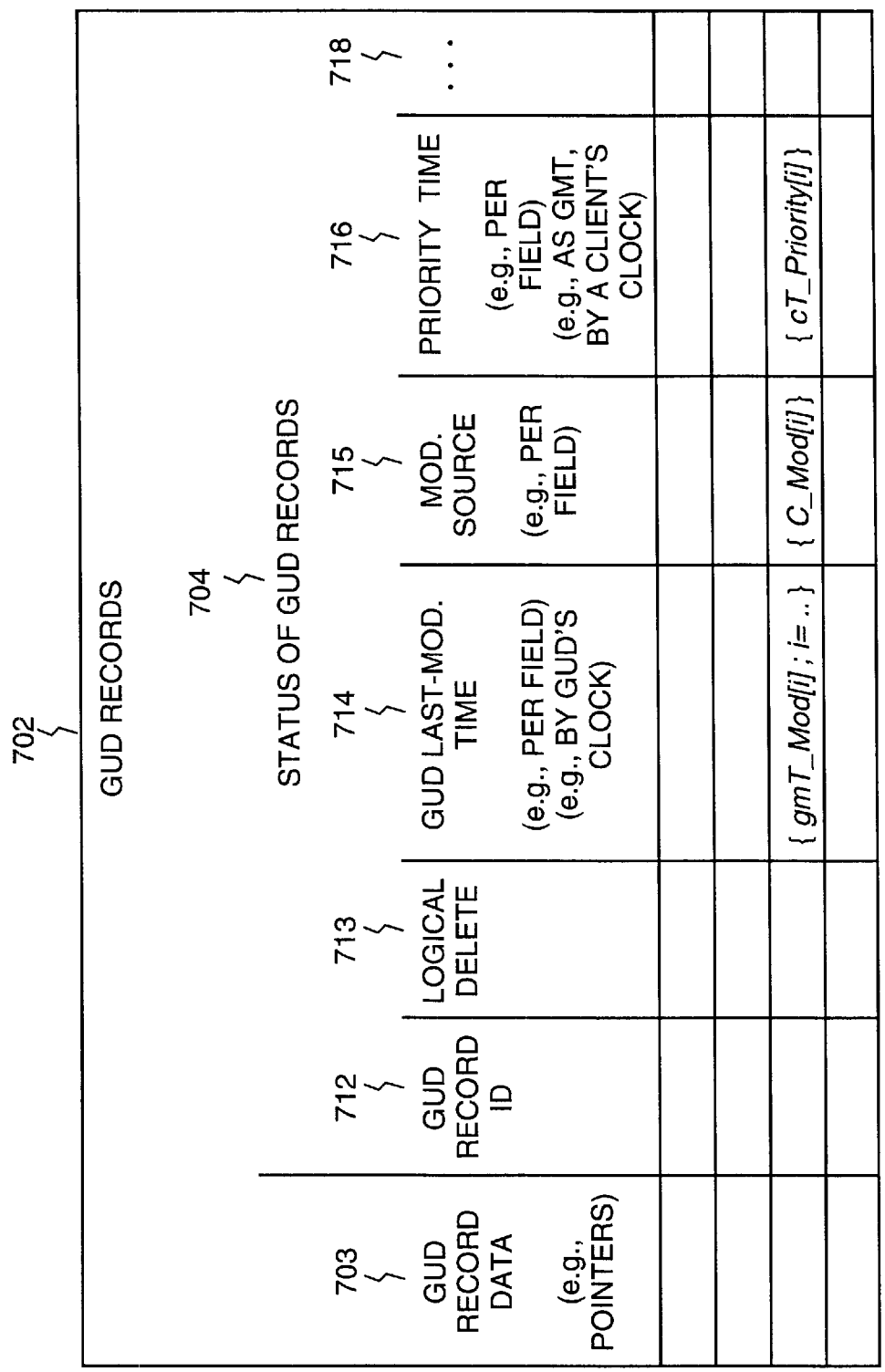
FIG. 7B is a table that shows records of the GUD, including their data and some of their status information, according to the preferred embodiment.

FIG. 7B is a table that shows the GUD records 702 (from FIG. 7A), including their data 703 and some of their status information 704. In FIG. 7B, each row 708 of the table represents a GUD record. The status information 704 preferably includes information for determining which GUD records are fresh with respect to a given client—i.e., which GUD records include values or status (e.g., "deleted") that a client may not have seen before. The status information 704 also preferably includes information for resolving conflicts, automatically or with user assistance. More particularly, according to the preferred embodiment, the status information 704 includes for each GUD record a unique GUD record identifier 712 ("GUD ID"), a logical delete flag 713, GUD last-modified timestamp information 714, last-modification source-client information 715, priority information 716, and other information 718.

Each GUD ID 712 uniquely identifies a GUD record within the GUD. In the preferred embodiment, each GUD ID is an integer having at least 32 bits.

The logical delete flag 713 is used to indicate that a GUD record is to be considered "deleted," for example as the result of a synchronization or a user modification via the optional U.I. 245. The GUD record itself is not completely and physically deleted, and thus the "deletion" is only a "logical deletion."

The GUD last-modified timestamp information 714 includes at least one timestamp that indicates when the GUD record was last modified in the GUD. Preferably, the GUD last-modified timestamp information 714 includes a separate last-modification timestamp according to the engine's (i.e., GUD's) clock for each data field of the GUD record. The timestamp for each data field of each record indicates the time that the data field of the record was modified in the GUD. The GUD last-modified timestamp information 714 can be used to determine whether the GUD record is fresh with respect to particular clients, as will be further explained. The timestamp for each data field i of a given GUD record may be referred to as gmT_Mod[i].

The last-modification source-client information 715 includes an identifier (e.g., a mapping table ID) that indicates from which dataset the last modification came. The source dataset is either a client or may be the GUD itself, if for example the changes come from the user via the GUD's user interface. Preferably, the last-modification source-client information 715 includes a separate dataset (e.g., client) identifier for each data field of the GUD record. The dataset identifier for each data field of each record indicates the dataset from which the last change to the data field of the record came. The client identifier for each data field i of a given GUD record may be referred to as C_Mod[i]. (The prefix C_ is to suggest "Client".)

The priority information 716 indicates the priority for the record, for use in resolving data conflicts. Preferably, the priority information 716 includes a separate priority for each data field of the GUD record. Preferably, the priority is an "original priority" timestamp that indicates the time that a record was last modified in a dataset (e.g., by a user) not due to synchronization by the synchronizer. (In general, data having later original priority time will be preferred over data having older original priority time according to the preferred conflict-resolution rules.) The original priority timestamps are preferably stored according to GMT, or at least convertible on-the-fly into GMT. The priority for each data field i of a given GUD record may be referred to as cT_Priority[i].

2. Status with regard to the Clients' Records (Mapping Tables)

Figure 7C:
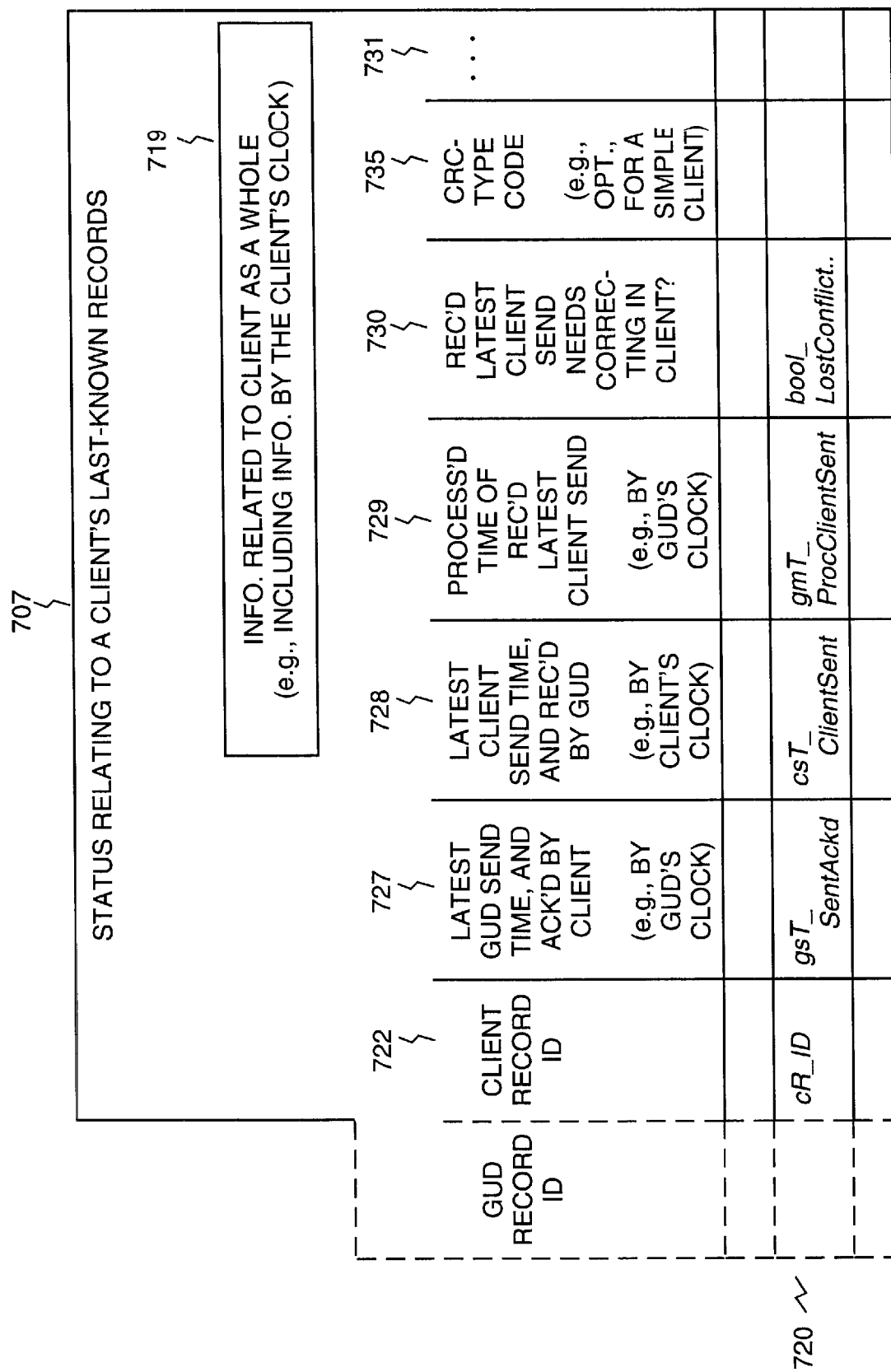
FIG. 7C is a table that shows portions of the mapping table (of FIG. 7A) that describes a particular client's last-known records and their relationship to the GUD's records.

FIG. 7C is a table that shows portions of the mapping table 707 (from FIG. 7A) that includes status information relating to a particular client. The mapping table 707 includes status information 719 about the client as a whole, for example its status, capabilities, limitations, and preferences as will be further described in later sections. The mapping table 707 also contains status information about each individual record last known by the synchronizer to be in the client. In FIG. 7C, each row 720 of the mapping table 707 corresponds to one particular GUD record. If a GUD record has a corresponding record in the client, then the GUD record's row in the mapping table will include both the GUD record's GUD ID and its client record's client ID 722, to thereby map the two ID's to each another. (A client ID uniquely identifies a client record within the client or client accessor.) If no record in the client corresponds to the GUD record, then the GUD record's row in the mapping table will be nonexistent or empty.

The mapping table preferably includes information for determining which GUD records are fresh with respect to the client. The status information also preferably includes information for detecting whether changes received from a client are obsolete (e.g., superseded). The status information also preferably includes information for sending to the client to enable the client to determine whether changes received from the GUD are obsolete (e.g., superseded). More particularly, in the preferred embodiment, the status information for each record includes a last-sent-and-ack'd (acknowledged) timestamp 727, a last-client-sent timestamp 728, a client-send-last-processed timestamp 729, a client-send-needs-correcting code 730, and other information 731. For certain clients, the mapping table 707 also includes a CRC-type result 735.

The client record ID 722 may be an integer or a descriptor (e.g., values of key data field(s)), depending on the particular client. The client record ID uniquely identifies a record within the client. The client record ID may be referred to as cR_ID. (The prefix cR_ is to suggest "client record".)

The last-sent-and-ack'd timestamp 727 for each GUD record indicates the time that a change for the GUD record (e.g., addition, modification, or deletion) was most recently sent to the client and also subsequently verified as received by the client. The last-sent-and-ack'd timestamp 727 is intended to be compared with modification times in the GUD for establishing relative order and determining freshness with respect to the client. The last-sent-and-ack'd timestamp 727 is preferably according to the GUD's clock. The last-sent-and-ack'd timestamp 727 for a given GUD record may be referred to as gsT_SentAckd.

The last-client-sent timestamp 728 for each GUD record indicates the time (e.g., counter value) at which the client most recently sent to the GUD a change (e.g., addition, modification, deletion) from the client's corresponding record. As will be discussed, such timestamps are sent by the client to the synchronizer along with each dataset change. The last-client-sent timestamp 728 for any record is intended to be compared with other send times from the client for establishing relative order and determining obsolescence of change(s) received from the client (e.g., in a non-FIFO context). The last-client-sent timestamp 728 is preferably according to the client's clock (e.g., counter). The last-client-sent timestamp 728 for a given GUD record may be referred to as csT_ClientSent.

The client-send-last-processed timestamp 729 for each GUD record indicates the time at which the synchronizer engine most recently processed (and did not discard) the last-sent change from the client's corresponding record. The client-send-last-processed timestamp 729 is intended to be compared with modification times in the GUD for establishing relative order and determining freshness with respect to the client. The client-send-last-processed timestamp 729 is preferably according to the GUD's clock. The client-send-last-processed timestamp 729 for a given GUD record may be referred to as gmT_ProcClientSent, as will be further explained later.

The client-send-needs-correcting code 730 for each GUD record indicates whether, based on the last-sent change from the client's corresponding record, the client's corresponding record needs to be changed to match the GUD record. More particularly, if the last-sent change from the client's record lost a conflict resolution in at least one data field, then the client's record would need to be corrected, based on the last-sent change. The client-send-needs-correcting code 730 for a given GUD record may be referred to as bool_LostConflictClientSent.

The CRC-type result 735, present for certain clients, characterizes the value of the client record as last known to the synchronizer. The CRC-type result 735 is useful for quickly determining via direct comparison whether the value of the client record has changed on the client since the previous synchronization of the client by the synchronizer. In particular, the CRC-type result is needed for this purpose if the client is of the type that does not maintain a last-modified timestamp for its records, as will be further discussed in connection with synchronization methodologies. The CRC-type result 735, in an embodiment, may include a subcomponent (e.g., relating to just a few key record fields) that is used for determining equivalence for duplicate resolution purposes.

In the preferred implementation, a mapping table exists for each client. Thus, each GUD record is capable of being mapped to all possible clients that the synchronizer is capable of synchronizing. In particular, each GUD record may be mapped to records in one, two, or more than two clients (e.g., datasets). Even more particularly, the GUD may include just a single copy of a particular GUD record, and that single copy corresponds to, and may be mapped to a record from each of one, two, or more than two clients. Each mapping table has a unique mapping table ID. Because the status information in all mapping tables includes information of client records corresponding to GUD records, the status information 706 may also be considered a part of the GUD records 702—i.e., each GUD record 708 (of FIG. 7B) can be considered to include not only the GUD record's data (e.g., a pointer) and its status in the GUD, but also the status (e.g., information of row 720) of the GUD record's corresponding records in other datasets.

Reference may be made to the incorporated patent applications having Ser. Nos. 09/136,215 and 09/208,815 for further details of the architecture underlying the present invention, including the means for establishing a mapping of records and record fields across datasets, to the extent that the incorporated patent applications are not contradicted (superseded) by the present document.

C. Client Dataset and Accessor

Figure 8:
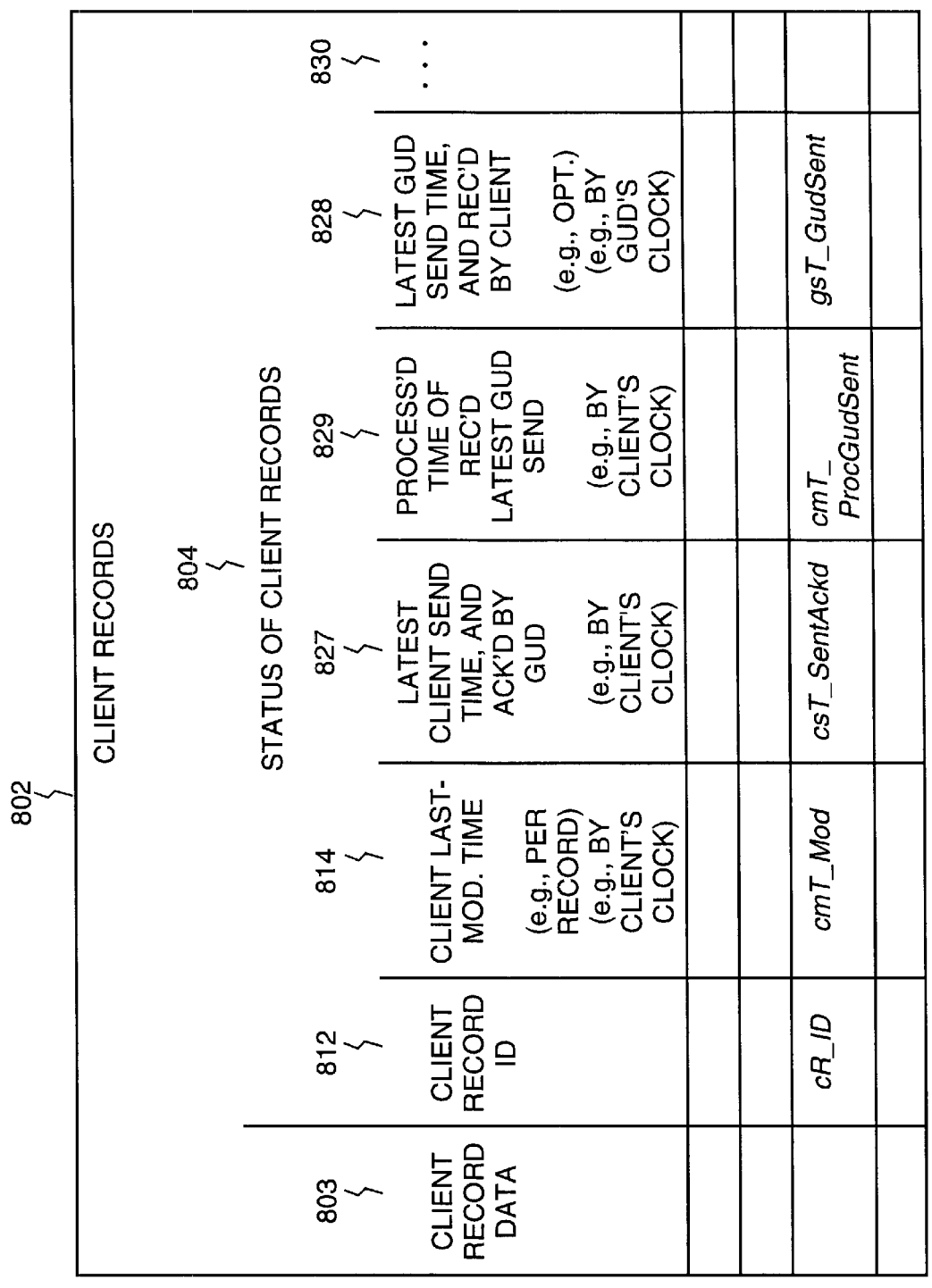
FIG. 8 is a table that shows records within a client, including their data and some of their status information, according to the preferred embodiment.

FIG. 8 is a table that shows client records 802, including (user) data 803 and some status information 804, that are preferably available to the client accessor. In general, different client datasets are free to and are expected to store their records in possibly different formats and using possibly different storage technologies from one another. The accessor for each client includes the client-specific knowledge for accessing client records and transferring their contents or status as necessary to the synchronizer core using action objects. In FIG. 8, each row 808 of the table represents a client record. The status information 804 preferably includes information for determining which client records are fresh with respect to the GUD; i.e., which records include values that the GUD may not have seen before. The status information 804 also preferably includes information for determining whether changes received from the GUD/server are obsolete (e.g., superseded). More particularly, according to the preferred embodiment, the status information 804 includes for each client record a unique client record identifier 812 ("client ID"), client last-modified timestamp information 814, a last-sent-and-ack'd (acknowledged) timestamp (e.g., counter) 827, a last-GUD-sent timestamp 828, a GUD-send-last-processed timestamp 829, and other information 830.

Each client ID 812 uniquely identifies a client record within the client accessor. In the preferred embodiment, each client ID is an integer having at least 32 bits. The client record ID may be referred to as cR_ID.

The client last-modified timestamp information 814 includes at least one timestamp that indicates when the client record was last modified in the client. Generally, for typical clients (e.g., the REX PRO™ organizer) the client last-modified timestamp information 814 includes just one last-modification timestamp for each client record, by the client's clock (e.g., counter). The client last-modified timestamp information 814 can be used to determine whether the client record is fresh with respect to the GUD. The last-modified timestamp for a given client record may be referred to as cmT_Mod.

The last-sent-and-ack'd timestamp 827 for each client record indicates the time that a change for the client record (e.g., addition, modification, or deletion) was most recently sent to the GUD/server and also subsequently acknowledged (ack'd) as received by the GUD/server. The last-sent-and-ack'd timestamp 827 is intended to be compared with modification times in the client for establishing relative order and determining freshness with respect to the GUD. More particularly, as will be seen, the last-sent-and-ack'd timestamp 827 is used to enable the client to leave the client dataset unlocked even when (inbound) changes are expected. The last-sent-and-ack'd timestamp 827 is preferably according to the client's clock (e.g., counter) that is used for timestamping record modifications. The last-sent-and-ack'd timestamp 827 for a given client record may be referred to as csT_SentAckd.

The last-GUD-sent timestamp 828 for each client record indicates the time at which the GUD/server most recently sent to the client a change (e.g., addition, modification, deletion) from the GUD's corresponding record. As will be discussed, such timestamps are sent by the server to the client along with each dataset change. The last-GUD-sent timestamp 828 for any record is intended to be compared with other send times from the GUD for establishing relative order and determining obsolescence of change(s) received from the GUD (e.g., in a non-FIFO context). The last-GUD-sent timestamp 828 is preferably according to the GUD's/server's clock (e.g., counter). The last-GUD-sent timestamp 828 for a given client record may be referred to as gsT_GudSent.

The GUD-send-last-processed timestamp 829 for each client record indicates the time at which the client most recently processed (and did not discard) the last-sent change from the GUD's corresponding record. The GUD-send-last-processed timestamp 829 is intended to be compared with modification times in the client for establishing relative order and determining freshness with respect to the GUD. (The later of the GUD-send-last-processed timestamp 829 and the last-sent-and-ack'd timestamp 827 is preferably used as the "last-synchronized" time for the record.) The GUD-send-last-processed timestamp 829 is preferably according to the client's clock. If the received last-sent change from the GUD had caused a modification to the client record, the last-modified timestamp information 814 would be no later than this GUD-send-last-processed timestamp 829. The GUD-send-last-processed timestamp 829 for a given client record may be referred to as cmT_ProcGudSent, as will be further explained later.

Note that most client datasets typically maintain the field cmT_Mod natively in the dataset itself. For legacy client datasets not designed with the present invention in mind, the client accessor is responsible for separately maintaining the fields csT_SentAckd, gsT_GudSent, and cmT_ProcGudSent, perhaps in the client accessor's own assigned storage area (e.g., persistent storage), for use in synchronization. This is a means of retrofitting a legacy client device to work with the present invention. Note that according to the present invention, during ordinary, non-synchronization use of the client dataset (e.g., by the user), the fields csT_SentAckd, gsT_GudSent, and cmT_ProcGudSent are not needed. Instead, these fields need only be used by the client accessor for synchronization.

VI. A More Detailed Discussion: Synchronization Methodologies

A. Introduction to Synchronization Messages ("Action Objects")

Synchronization methods of the present invention communicate via synchronization messages called action objects. Action objects are used to communicate dataset changes and other signals. The meanings and usages of action objects according to the present invention are not limited to a chatty, single-session synchronization context. Action objects relevant to synchronization according to the present invention include the following types, which will be further described:

- Action Insert Record (C-Dominant Version)
- Action Update Record (C-Dominant, C-Untested, and (optionally) C-Conflicting Versions)
- Action Delete Record (C-Dominant, C-Untested, and (optionally) C-Conflicting Versions)
- Action Existing Record List (C-Untested Version)
- Action Request Ack Records
- Action Ack Records
- Action Retrieve Records
- Action Update Map
- Action Request Ack Maps
- Action Ack Maps
- Action Backup Record (Optional)
- Action Last Backup Sent (Optional)
- Action Retrieve Backup (Optional)

B. Further Discussion of the Time stamps of the GUD and the Client(s)

During synchronization, several types of timestamps may be encountered. In general, a timestamp is either from the client's clock, or from the server's clock. When possible, the present invention avoids directly comparing times from any client's clock with times from the server's clock or another client's clock. However, the synchronizer will perform such comparisons for timestamp-based automatic conflict resolution (e.g., "latest change wins") if the timestamps in question are known to be globally-usable (e.g., convertible into GMT).

In general, a timestamp is either a record modification time or a synchronization communication time (e.g., send time). Preferably, each dataset (client or GUD) uses a same clock (e.g., a dataset-specific counter) to generate modification timestamps and timestamps of synchronization communications or activities. In this way, modification timestamps and synchronization times from the same dataset (or its accessor) can be compared.

In this document, certain variables (e.g., "csT_ SentAckd") are used. In these variables, the prefixes have the following meanings:

| | |
|---|---|
| cT_ | Time by client clock (and sometimes also GUD clock), if known to be globally-usable. |
| cmT_ | Time by client clock that is used for modifications. Without further information, do not assume is globally-usable. |
| csT_ | Time by client clock that is used for synchronization communications. Without further information, do not assume is globally-usable. Preferably, will be able to assume that csT_-time can be compared with cmT_-time. |
| gT_ | Time by GUD clock, if known to be globally-usable (as is preferred). |
| gmT_ | Time by GUD clock that is used for modifications. Without further information, do not assume is globally-usable. In practice, preferred GUD clocks will always produce globally-usable time. |
| gsT_ | Time by GUD clock that is used for synchronization communications. Without further information, do not assume is globally-usable. In practice, for preferred GUD clocks, can always assume that gsT_-time can be compared with gmT_-time. |

As mentioned in connection with FIG. 8, the client preferably maintains at least the following status information for each record:

| | |
|---|---|
| cmT_Mod | Time of last modification of the record in the client, by the client's clock. This field will always have a value. |
| csT_SentAckd | Send time by the client's clock of the latest send (to the server) that was subsequently receipt-acknowledged (ACK'd) by the server. The send refers to a change (addition, modification, or possibly deletion) involving this record. Initial value is <MIN> (e.g., negative infinity). |
| gsT_GudSent | Latest GUD send time, as provided by the GUD according to the GUD's clock, on any change involving this record that was received from the GUD and processed. Initial value is <MIN>. |
| cmT_ProcGudSent | Time finished processing the latest-sent received change (from the GUD) involving this record. Initial value is <MIN>. |

As mentioned in connection with FIG. 7B, the GUD preferably maintains at least the following status information for each field i of each GUD record:

| | |
|---|---|
| gmT_Mod[i] | Time of last modification of field i of the record in the GUD, by the GUD—s clock. gmT_Mod[i] will always have a value. |
| C_Mod[i] | Identifier for the particular dataset (e.g., a particular client or the GUD itself) from which the last modification to the field i came. C_Mod[i] will always have a value. |
| cT_Priority[i] | The original priority time for the current value of the field i of the GUD record, by a globally-usable clock. If no globally-usable priority time is associated with the current value of the field i, then cT_Priority[i] is set to <MIN>. |

As mentioned in part in connection with FIG. 7C, the GUD preferably maintains, in a mapping table, at least the following status information for each GUD record with regard to each particular client:

| | |
|---|---|
| _UsedRecordFields_ | The record fields used by this client. |
| gmT_ModByOther | Latest GUD modification time, not caused by this client for a client-used field. If no such modification time exists, the value is <MIN>. Note that this status field is useful conceptually but needs not actually be persistently stored. Instead, this status field may be generated on-the-fly from other status fields (e.g., from gmT_Mod[i], and C_Mod[i]). |
| gsT_SentAckd | Send time by the GUD's clock of the latest send (to the client) that was subse- |

| | -continued |
|---|---|
| | quently ACK'd by the client. The send refers to a change (addition, modification, or possibly deletion) involving the GUD record. Initial value is <MIN> |
| csT_ClientSent | Latest client send time, as provided by the client, on any change involving this record that was received from the client and processed. Initial value is <MIN>. |
| bool_LostConflictClientSent | When the latest-sent received change (from the client) involving this record was processed, did it appear that the client's corresponding record needed correcting? (For example, did the latest-sent received change lose a conflict resolution in any field?). Initial value is <NO>. |
| gmT_ProcClientSent | Time finished processing the latest-sent received change (from the client) involving this record. Initial value is <MIN>. |

C. Determining, Sending, and Receiving Dataset Changes

Processing of dataset changes lies at the heart of the present invention. According to the present invention, the transferring of dataset changes can be properly handled by the client and the server, outside the context of a pre-defined, full, sequential, session-based synchronization. In particular, any of the action objects can be sent or received by the client or the server at any time such that wanted data cannot be erroneously lost in the system as a whole. Dataset changes (e.g., additions, modifications, deletions) in the present invention may be classified as "c-dominant", "c-untested", or, optionally, "c-conflicting". C-dominant changes are changes that the sender (e.g., the server) has determined should take precedence over a previous state of the recipient's (e.g., a client's) data. C-untested changes are changes not known by the sender (e.g., a client) to have, or not to have, precedence over a previous state of the recipient's (e.g., the server's) data. C-conflicting changes are changes that the sender (e.g., the server) has determined to be in unresolved conflict with a previous state of the recipient's data (e.g., with a corresponding record found in the previous state of the recipient's data). In general, any record change (c-dominant, c-untested, or c-conflicting) sent by a sender to a recipient is intended to take precedence over any change previously sent by the sender to the recipient relating to the same record.

For a preferred embodiment of the present invention, in a preferred environment, a client being synchronized provides globally-usable timestamps for its records and in its communications, and the server also includes globally-usable timestamps for its GUD records (e.g., priority timestamps) and for its communications. Preferably all datasets ever synchronized by the synchronizer provide globally-usable timestamps for their records and for their communications. In this preferred embodiment and environment, 1) record changes sent from the client to the server can be, and preferably always are, c-untested changes, 2) record changes sent from the server to the client can be, and preferably always are, c-dominant changes, and 3) c-conflicting changes need not ever be sent, and preferably are not ever used. For simplicity only, unless otherwise stated or unless context demands otherwise, discussion in this document may use language as if to assume that record changes sent from the client to the server are always c-untested changes and that record changes sent from the server to the client are always c-dominant changes, as is true in the preferred embodiment and environment. It is to be understood that this simplification, and other simplifications made for ease of description, are not meant to limit the scope of the invention.

1. C-Untested Changes (e.g., Not Conflict-Tested or -Resolved)

a. Sending C-Untested Changes (e.g., by Client)

In the preferred embodiment, the client may send any number of changes, preferably fresh changes, to the server whenever it wants to (e.g., at any time). These changes are preferably sent as c-untested record changes. For example, the sending 520A of fresh client changes in the method 500 of FIG. 5A is a sending of c-untested changes according to the preferred embodiment.

C-untested record changes are sent using the C-Untested Versions (or ways of using) the following action objects: Action Update Record, Action Delete Record, and Action Existing Record List. Action Update Record (C-Untested Version) is used to send one (or more) modified or new record(s) to the recipient. Action Delete Record (C-Untested Version) is used to send one (or more) record deletion(s) to the recipient. Action Existing Record List (C-Untested Version) is used to send information indicating all desired record deletion(s) to the recipient. All of these action objects generally include the following information (ChngCU Arg1-ChngCU Arg5) for each record being added, modified, or deleted: (preferably, ChngCU Arg1-ChngCU Arg4 are all present)

| | |
|---|---|
| ChngCUArg1 | Record ID in sender. (e.g., cR_ID) from a client.) |
| ChngCUArg2 | Record data (unless is a deletion). Preferably, for a record modification, all data fields used by the recipient are sent, whether or not they were modified. Under an alternative option, for a record modification, only the data fields that have changed with respect to the previously synchronized version of the record is included. (Under the option, the sender would have kept track of which fields have so changed and know to send just those.) |
| ChngCUArg3 | Original priority time, e.g., deletion time or user-modification time in the sender. (e.g., cmT_Mod from a client.) |
| ChngCUArg4 | Send time by sender's clock (e.g., a client's counter). (e.g., an indicator of the version of the sender's record.) This is an important piece of sent information according to the present invention. ChngCUArg4 will be further described below. |
| ChngCUArg5 (Optional) | Latest send-time previously received by the current sender from the current intended-receiver involving the record. (e.g., gsT_GudSent from a client.) (ChngCUArg5 is not needed in the preferred embodiment, in which: all timestamps are globally-usable; all clients send only c-untested changes; and only the GUD sends c-dominant changes.) |

Note that the Action Existing Record List (C-Untested Version) action object does not actually list ChngCU Arg1, the Record ID(s) of records to be deleted. Rather, Action Existing Record List (C-Untested Version) includes a list of all existing records in the sender. Because the recipient (e.g., the server) is assumed to know (e.g., in a mapping table) the list of existing records in the sender at a previous time, the recipient can determine, by omission from the sent list (ChngCU Arg1), the formerly existing records in the sender that are now to be deleted. Note that Action Existing Record List (C-Untested Version) is an alternative to Action Delete Record (C-Untested Version) for clients that do not keep a list of deleted records. Action Existing Record List (C-Untested Version) causes all records in the recipient that were previously mapped to records in the sender to be deleted that are not on the sent list. Preferably, to reduce complexity, all clients can use Action Delete Record (C-Untested Version), and Action Existing Record List (C-Untested Version) needs not be supported by the server.

b. Receiving and Processing C-Untested Changes (e.g., by Server)

The recipient (e.g., the server) deals with each received c-untested record change (for example, changes received 521A by the server in the method 500 of FIG. 5A) as follows:

STEP 1: DISCARD IF IS OBSOLETE VS. SENDER, for example, as follows:
1) If the just-received change corresponds to an existing record in the recipient (e.g., a GUD record, as identified by finding the client record ID (ChngCU Arg1) in the GUD's mapping table for the client), then:
   A) compare the just-received send time (ChngCU Arg4) of the just-received change with the latest client-send-time (csT_ClientSent) that was previously received from the client in connection with this record.
   B) If the send time (ChngCU Arg4) is no later than (i.e., is less than or equal to) the latest previously-received send time (csT_ClientSent) from the client, then discard the just-received change entirely because the just-received change is obsolete. (Perhaps, the just-received change was flipped in non-FIFO transit versus a later-sent change for the same record.) Forget the just-received change completely, as if it had been lost in transit. In particular, receipt of the just-receipt changed should not later be acknowledged to the sender.
   C) Otherwise (i.e., ChngCU Arg4>csT_ClientSent), the just-received change is not obsolete. Accept the just-received change for further processing by proceeding to STEP 2.

STEP 2: CONSIDER THE CHANGE TO BE "OFFICIALLY" RECEIVED, for example, as follows:
1) Set csT_ClientSent to equal ChngCU Arg4.
2) Optionally, copy the client record ID (ChngCU Arg1) and the send-time (ChngCU Arg4) into a "recently-sent-received-changes" list for the client, in order to possibly speed up future acknowledging of the received change. The recently-sent-received-changes list contains information about all received changes from the sender that were sent after a cutoff time. The recently-sent-received-changes list is maintained in sorted order, according to the send-times of the changes. If the recently-sent-received-changes list grows too large, it may be pruned from the side having the oldest send-times (i.e., by resetting the cutoff time to be later). Proceed to STEP 3.

STEP 3: PERFORM CONFLICT RESOLUTION, for example, as follows:
1) For a record deletion received from the client:
   A) if the corresponding GUD record is already deleted, then ignore the client's deletion, but
      i) if the client supplied a client record deletion time (ChngCU Arg3) and that deletion time is later than the GUD record's priority deletion time, set the GUD record's priority deletion time to the client record's deletion time, and record that the change to the GUD record came from the client. Preferably, the GUD record's priority deletion time is simply cT_Priority[i] for any field i, and when the GUD record's priority deletion time is set to the client record's deletion time, the value of cT_Priority[i] is set to ChngCU Arg3 for all fields i, and the value of C_Mod[i] is set to indicate the client for all fields i.
   B) Otherwise (i.e., the corresponding GUD record is not already deleted), if the latest priority time for the corresponding GUD record is later than the client record delete time (ChngCU Arg3) (or later than the last sync time, if the delete time (ChngCU Arg3) is unavailable), then ignore the client's deletion and mark the GUD record for later re-propagation back to the client as an addition. The latest priority time for a GUD record in this context is max(cT_Priority[i]) for any field i. The marking of the GUD record for re-propagation to the client can be performed by deleting the GUD record's client ID and other status fields in the mapping table. (If no client record delete time (ChngCU Arg3) was supplied by the client, then the last sync time used for the comparison with the GUD record's latest priority time can be computed as max(gsT_SentAckd, TEMP), where TEMP contains the old value of csT_ClientSent before it was overwritten by ChngCU Arg4 of the just-received record.
   C) Otherwise (i.e., the corresponding GUD record is not already deleted and does NOT have later priority time), mark the corresponding GUD record for deletion or actually go ahead and delete the GUD record. Deleting the GUD record includes: setting its logical delete flag to TRUE, deleting its data but not its status information, setting its last modification time (e.g., gmT_Mod [i] for every field i) to the current time; setting its source-client identifier (e.g., C_Mod[i] for every field i) to indicate the client, setting its GUD record priority time (e.g., cT_Priority[i] for every field i) to the client record's deletion time ChngCU Arg3.
2) for a modified or added record from the client:
   A) if no corresponding GUD record exists, add the record into the GUD. (This preferably includes duplicate resolution, which is described for example in the incorporated U.S. patent application having Ser. No. 09/136,215.)
   B) if a corresponding GUD record exists, compare the priority times of the client record and the GUD records to determine a winner for each field and merge the records, with the winning priority time (s) becoming the priority time of the merged record. Preferably, field-by-field priorities cT_Priority[i] are kept in the GUD and are used by the server in merging records. Generally, the client's record keeps priority time (e.g., modification time) ChngCU Arg3 on a record-level and not a field-level, therefore the single record-level priority time ChngCU Arg3 is used as the priority time for all the client record's fields. For every field i of the client record that wins a conflict, then the server: sets the GUD record's data field i to the value of the client's field i; sets the GUD record's gmT_Mod[i] to the current time by the GUD's clock; sets the GUD record's C_Mod[i] to the client's identification code; sets the GUD record's cT_Priority[i] to the client record's priority time for the field (e.g., ChngCU Arg3); sets the reception-processed time (e.g., client's cmT_

ProcGudSent) to a time no earlier than the newly-set modification time gmT_Mod[i]. If any field i of the client record loses a conflict, the server sets the GUD record's bool_LostConflictClientSent to TRUE.

c. Requesting Ack of C-Untested Changes (e.g., by Client)

In the preferred embodiment, the client may send a request for acknowledgment of receipt of its sent changes whenever it wants to (e.g., at any time). The requesting 524A of acknowledgment of sent client changes in the method 500 of FIG. 5A is exemplary.

To request acknowledgment of the receipt of sent changes, the sender sends an Action Request Ack Records action object to the recipient. This action object preferably includes an indication or characterization of the sent changes for which acknowledgment is desired. Preferably, the indication takes the form of the sender's timestamp:

| | |
|---|---|
| ReqAckArg1 | Timestamp (e.g. of csT_type) of the earliest-sent change for which acknowledgment is desired, wherein only the latest-sent received change for any one record needs to be acknowledged. |

Thus, the preferred semantic of Action Request Ack Records is: "please acknowledge the changes that you have received from me that I sent on or after the ReqAckArg1 timestamp by my clock, but only acknowledge the latest-sent received change for any one record." In an alternative form (or usage), the Action Request Ack Records specifically lists the client record IDs of the sent records for which acknowledgment is desired (e.g., "please acknowledge the latest-sent change that you have received from me involving the following records").

Preferably, the sender keeps track of which sent changes still need acknowledgment, in order to provide an appropriate ReqAckArg1. One way of keeping track is for the sender to maintain an up-to-date list of send-times and client-IDs of all not-yet-acknowledged sent changes for which acknowledgment is still desired. (Acknowledgment becomes no-longer desired if an unacknowledged sent change involving a record is superseded by a newer and different sent change involving the record.) The oldest send time in the list is suitable for use as ReqAckArg1. The list may be pruned occasionally if a set of old unacknowledged sends is presumed lost. (Instead of pruning the list, a more elaborate scheme may also be used, in which any client record that appears in the list more than once (e.g., the identical change has been sent more than once) is excluded from determination of ReqAckArg1, and instead acknowledgment for such records is sought explicitly using the alternative form of Action Request Ack Records.)

d. Sending Ack of C-Untested Changes (e.g., by Server)

The recipient responds to a received Action Request Ack Records for c-untested changes (e.g., Action Update Record and Action Delete Record changes) in a straightforward manner by sending one or more Action Ack Records action object(s) that together contain the client record IDs (e.g., cR_ID in GUD) and send-times (e.g., csT_ClientSent in GUD) of the received changes for which acknowledgment is requested. The acknowledging 528A of received client changes in response to a received 525A request in the method 500 of FIG. 5A is exemplary.

In the preferred embodiment, the server does maintain the recently-sent-received-changes list discussed above, and if the earliest send time ReqAckArg1 for which acknowledgment is requested is within the range of sent-times covered by the recently-sent-received-changes list, then the server fully responds to ReqAckArg1 merely by sending acknowledgments for the records found in the recently-sent-received-changes having send times no earlier than ReqAckArg1 (e.g., by sending their cR_ID and csT_ClientSent, either as found in the GUD or by finding each such record's latest send-time in the recently-sent-received-changes list). Otherwise (i.e., the earliest send time ReqAckArg1 is not within the range of a maintained recently-sent-received-changes list), the server fully responds to ReqAckArg1 by examining the csT_ClientSent fields of every record in the mapping table for the client, and acknowledging every record having csT_ClientSent no less than ReqAckArg1. If the received Action Request Ack Records action object explicitly lists client record ID(s) to be acknowledged, then the server includes, in the Action Ack Records action object, the client record ID(s) plus their status field(s) csT_ClientSent from the GUD's mapping table for the client.

e. Receiving Ack of C-Untested Changes (e.g., by Client)

When the client receives Action Ack Records action object from the server, the client removes from the list of not-yet-acknowledged sent changes, for each client record send that is acknowledged, all entr(ies) involving that client record that have send times no later than the acknowledged send time. The client also sets the status field csT_SentAckd for each acknowledged client record to the received value, if the received value is later than the existing value of csT_SentAckd. If the sent change being acknowledged was a delete, the client may discard information regarding the delete from its deleted-records list, which is further discussed below, (assuming that the client has no further use for the deleted-record list outside of its use in synchronizing with the server). The client's receipt 529A of acknowledgments from the server in the method 500 of FIG. 5A is exemplary.

f. Determining Fresh Changes (e.g., by Client) In the First Place

Changes (deletions, modifications, additions) that have been made to any client record without the server's guaranteed knowledge are considered fresh changes. Generally, changes that have been made to any client record after the time of the record's last synchronization with the server are fresh. Preferably, the time of a record's last synchronization is the greater of the record's csT_SentAckd and cmT_ProcGudSent status fields. For records that have been freshly deleted in the client, the client dataset preferably keeps track of the deleted records' client record IDs (client's native unique identifiers), deletion times (by the client's clock), and status information 804 (of FIG. 8) in a list that can be called a deleted-records list.

The client determines the identities of deleted records, for example, as follows:

1) if the client keeps track of fresh deletions (preferred), compare each record's delete time to the time of the record's last synchronization with the server. If the delete time is later, then the delete is fresh with respect to the server.
2) Otherwise (i.e., the client is the type that does not keep track of fresh deletions), use the IDs of all existing client records to specify, by omission versus the server's knowledge of the prior contents of the client, the fresh deletions.

The client determines modified records and added records, for example, as follows:

1) if the client keeps last-modification timestamps (e.g., counter values) of records (preferable), then if the last-modification time of any record exceeds the time of the record's last synchronization with the server, then that record is either an added or updated record (the client doesn't need to worry exactly which type it is).

2) Otherwise (the client is of the non-preferred type that does not keep last-modification timestamps), the client will send CRC-type values (Cyclic Redundancy Check-type values) corresponding to the entire record for all records to the server so that the server can compare with the CRC-type values that were recorded for the client's records at the end of the previous synchronization of the record to quickly determine which have changed. Such CRC-type values may be sent via Action Update Record (C-Untested Version) action objects (e.g., along with all data for all records). Alternatively, such CRC-type values may be sent via an Action Existing Record List (C-Untested Version) action object (e.g., without all data for the records), whereupon the server can determine the changed records and specifically request them from the client using an Action Retrieve Records action object that specifically identifies and requests the changed client records.

2. C-Dominant Changes (e.g., Any Conflicts Have Been Resolved)

In the preferred embodiment, any client is capable of receiving and possibly using changes from the server at any time that the client is connected to the communication network. In particular, clients have this capability even if the clients include fresh changes that have not yet been sent to the server (or have been sent but have not been confirmed as received by the server). Further, clients have this capability even if they are relatively simple clients that lack conflict-resolution features found in the server (such as per-field priority times, timestamp-based conflict resolution, conflict detection based on record values, and the like, and others). Preferably, the server sends changes to the client only in response to a client request. Optionally, however, the server may unilaterally decide to "push" fresh changes to the client. Preferably, all changes from the server to the client are only ever sent as c-dominant (e.g., conflict-tested-and-resolved) changes.

a. Requesting C-Dominant Changes (e.g., by Client)

The client can request fresh (with respect to the client) changes from the server at any time. The sender (e.g., client) of such a request sends an Action Retrieve Records action object to the recipient (e.g., server). The Action Retrieve Records action object may request all fresh changes (default) or specify a list of client records for which fresh changes, if any exist, are desired. The client's requesting 532A of changes from the server in the method 500 of FIG. 5A is exemplary.

Optionally, the client does not request fresh c-dominant changes from the server until all previously-received c-dominant record additions from the server have been fully acknowledged (e.g., all mappings have been sent to the server and confirmation of all mappings have been received from the server, as will be described). This optional requirement can reduce the possibility of having duplicate records, and can therefore make it less necessary for the client to perform duplicate resolution (as will be described) on received c-dominant changes.

b. Sending C-Dominant Changes (e.g., by Server)

In the preferred embodiment, the server sends fresh changes to the client as c-dominant changes. The server's sending 536A of changes to the client, in response to the reception 533A of a request of changes, in the method 500 of FIG. 5A is exemplary.

C-dominant record changes are sent using the C-Dominant Versions (or ways of using) the following action objects: Action Update Record, Action Delete Record, and Action Insert Record. Action Update Record (C-Dominant Version) is used to send one (or more) modified record(s) to the recipient. Action Delete Record (C-Dominant Version) is used to send one (or more) record deletion(s) to the recipient. Action Insert Record (C-Dominant Version) is used to send one (or more) new record(s) to the recipient. All of these action objects generally and preferably include the following information (ChngCD Arg1 -ChngCD Arg5) for each record being added, modified, or deleted:

| | |
|---|---|
| ChngCDArg1 | Record ID in receiver. (e.g., cR_ID from a mapping table.) For a new record, no record ID yet exists in the receiver (e.g., client), and ChngCDArg1 is actually the record ID in the sender (e.g., server's GUD ID). |
| ChngCDArg2 | Record data (unless is a deletion). Preferably, for a record modification, all data fields used by the recipient are sent, whether or not they were modified. Under an alternative option, (e.g., for sophisticated recipients), for a record modification, only the data fields that have changed with respect to the previously synchronized version of the record is included. (Under the option, the sender would have kept track of which fields have so changed and know to send just those.) |
| ChngCDArg3 (Optional) | Original priority time (e.g., cT_Priority from the GUD.) |
| ChngCDArg4 | Send time by sender's clock (e.g., the GUD's clock). This is an important piece of sent information according to the present invention. ChngCDArg4 will be further described below. |
| ChngCDArg5 | Latest send-time previously received by the current sender from the current intended-receiver involving the record. (e.g., csT_ClientSent from a mapping table.) ChngCDArg5 is an important piece of sent information according to the present invention. ChngCDArg5 indicates the version of the recipient's record that was used in any conflict detection or resolution that has been performed by the sender. Thus, ChngCDArg5 indicates the sender's latest knowledge of the state of the recipient's data (at least for the affected record). ChngCDArg5 will be further described below. | c. Receiving and Processing C-Dominant Changes (e.g., by Client)

The recipient (e.g., the client) deals with each received c-dominant record change (for example, changes received 537A by the server in the method 500 of FIG. 5A) as follows:

STEP 1: DISCARD IF IS OBSOLETE VS. SENDER, for example, as follows:

1) If the just-received change corresponds to an existing record in the recipient (e.g., the change's record's ID (ChngCD Arg1) matches the ID of a record in the receiver (e.g., client); for example: for a record modification or deletion ChngCD Arg1 matches a record's cR_ID, or for a record addition ChngCD Arg1 matches a GUD record ID in the "inserted-record-to-be-acknowledged" list, which will be described), then:

A) compare the send time (ChngCD Arg4) of the just-received change with the latest GUD-send-time (gsT_GudSent) that was previously received from the GUD in connection with this record.

B) If the current send time (ChngCD Arg4) is no later than (i.e., is less than or equal to) the latest previously-received send time (gsT_GudSent) from the GUD, then discard the just-received change entirely because the just-received change is obsolete. (Perhaps, the just-received change was flipped in non-FIFO transit versus a later-sent change for the same record.) Forget the just-received change completely, as if it had been lost in transit. In particular, receipt of the just-receipt changed should not later be acknowledged to the sender. Proceed no further for this change.

C) Otherwise (i.e., ChngCD Arg4 >gsT__GudSent), the just-received change is not obsolete. Accept the just-received change for further processing by proceeding to STEP 2

STEP 2: SPECIAL HANDLING (e.g., DISCARD) IF AFFECTS FRESH-LY CHANGED RECORD (e.g., IS POSSIBLY-OBSOLETE VS. RECEIVER), for example, as follows:

1) If the just-received change corresponds to an existing record in the recipient (e.g., the change's record's ID (ChngCD Arg1) matches the ID of an existing record in the receiver (e.g., client)), then:

A) if the existing record in the receiver (e.g., existing client record) is NOT fresh with respect to the sender, then accept the just-received change for further processing by proceeding to STEP 3. (Freshness is determined according to previously described method(s).)

B) Otherwise, the existing record in the receiver (e.g., existing client record) is fresh with respect to the sender, and the new change if accepted unquestioningly may overwrite the fresh aspects of the existing record (e.g., client record). Therefore, special handling is needed. For simplicity, special handling preferably means that the just-received change should be discarded entirely, forgotten as if had gotten lost in transit, and not later acknowledged. Under an alternative option, the client may perform conflict detection and resolution between the just-received change and the fresh change in the existing record. The extent of such conflict resolution depends on the sophistication and capabilities of the client. At one extreme, the client may be as sophisticated as the server itself, and may do full-fledged, automatic field-based conflict resolution. On the other hand, the client may be relatively simple, and may only perform manually-assisted conflict resolution (e.g., display two conflicting versions of a record and allow the user to choose the winning value for each conflicting field). In any event, if conflict resolution is performed, and not all data from the received change is used, then the received change can be discarded, forgotten, and not later acknowledged. If all record fields from the received change are to be used, then the received change should be accepted for further processing by proceeding to STEP 3.

STEP 3 (OPTIONAL): PERFORM DUPLICATE RESOLUTION, for example, as follows:

If the optional STEP 3 is not being used, proceed directly to STEP 4.

Otherwise, if the just-received change would cause a duplicate record to exist in the recipient, then special handling is preferably performed. The just-received change may be compared to all records currently in the recipient to determine whether it would create a duplicate record. Duplicate resolution is described for example in the incorporated U.S. patent application having Ser. No. 09/136,215. For simplicity, special handling preferably means that the just-received change should be discarded entirely, forgotten as if had gotten lost in transit, and not later acknowledged. After this duplicate resolution step has been performed (if the option to perform it is desired), proceed to STEP 4.

STEP 4: CONSIDER THE CHANGE TO BE "OFFICIALLY" RECEIVED, for example, as follows:

1) Set gsT__GudSent to equal ChngCD Arg4.

2) Optionally, copy the recipient's record ID (ChngCD Arg1) and the send-time (ChngCD Arg4) for record modifications and deletions, but not for record additions, into a "recently-sent-received-changes" list, in order to possibly speed up future acknowledging of the received change. The recently-sent-received-changes list contains information about all received changes from the sender that were sent after a cutoff time. The recently-sent-received-changes list is maintained in sorted order, according to the send-times of the changes. If the recently-sent-received-changes list grows too large, it may be pruned from the side having the oldest send-times (i.e., by resetting the cutoff time to be later). Proceed to STEP 5.

STEP 5: COMMIT THE CHANGE, for example, as follows:

1) Commit the received change unquestioningly to the recipient's data. For example: copy the data into the record; set the recipient's record's modification time (e.g., client's cmT__Mod) to the current time; set the record's priority time to ChngCD Arg3, if the recipient keeps such a priority time that is separate from the modification time (; client's generally don't); and set the reception-processed time (e.g., client's cmT__ProcGudSent) to a time no earlier than the newly-set modification time. Of course, if the change is a new record addition, the new record is created first and the data is copied into the created record.

2) If the change is a record addition (e.g., Action Insert Record), additionally copy the recipient's record ID (ChngCD Arg1), the send-time (ChngCD Arg4), and the newly-created recipient record ID (e.g., the client's newly-created cR__ID) into an "inserted-record-to-be-acknowledged" list for future use in acknowledging the record addition (by sending record mappings, as will be described).

d. Requesting Ack of C-Dominant Changes (e.g., by Server)

In the preferred embodiment, the server may send a request for acknowledgment of receipt of its sent changes whenever it wants to (e.g., at any time). The requesting 540A of acknowledgment of sent server changes in the method 500 of FIG. 5A is exemplary.

Requesting acknowledgment of c-dominant changes (e.g., by the server) is done in the essentially same way as requesting acknowledgment of c-untested changes (e.g., by the client), as earlier described. Just re-read the previous description and mentally swap any references to server and client, except that references to client record IDs may not need to be mentally swapped for the reason described in the next paragraph.

One minor point worth noting is that c-untested changes generally use the sender's record IDs (e.g., client's record IDs) as ChngCU Arg1 whereas c-dominant changes generally use the recipient's record IDs (e.g., client's record IDs) as ChngCD Arg1 except for new records (for which ChngCD Arg1 is the sender's record IDs). However, this difference does not present a difficulty because the sender of c-dominant changes will never need to explicitly list sent new records that need acknowledging (under the Action Request Ack Records's alternative form or usage) because, as will be described, acknowledgment of record additions uses a different mechanism (communication of new mappings).

e. Sending Ack of C-Dominant Deletes and Mods. (e.g., by Client)

The change recipient (e.g., client) responds to a received Action Request Ack Records, with regard to c-dominant record deletions and modifications (e.g., Action Update Record and Action Delete Record changes), in a straightforward manner by sending one or more Action Ack Records action object(s) that together contain the client record IDs (e.g., cR_ID in the client) and send-times (e.g., gsT_GudSent of the client) of the received deletions and modifications for which acknowledgment is requested. An example is found within the acknowledging 544A step in the method 500 of FIG. 5A that responds to the receipt 541A of a request for acknowledgment.

Sending acknowledgment of c-dominant record deletions and modifications, but not additions, (e.g., by client) is done in the essentially same way as sending acknowledgment of c-untested changes (e.g., by server), as earlier described. Just re-read the previous description and mentally swap any references to server and client, except that references to client record IDs may not need to be mentally swapped for the reason described earlier (i.e., the recipient's (e.g., client's) record IDs are used for c-dominant changes (except record additions), whereas the sender's (e.g., client's) record IDs are used for c-untested changes).

f. Sending Ack of C-Dominant Adds: Sending Maps (e.g., by Client)

The change recipient (e.g., client) responds to a received Action Request Ack Records, with regard to c-dominant record additions (e.g., Action Insert Record changes), in a straightforward manner by sending one or more Action Update Map action object(s) that contain pairs of record IDs, and for each pair of record IDs the send-time (e.g., gsT_GudSent of the client record) of the received record addition for which acknowledgment is requested. There is one pair of record IDs for each record addition being acknowledged. Each pair is a mapping of the sender's record ID (which was sent as ChngCD Arg1 in the Action Insert Record action object) and the recipient's subsequently-created record ID. The send time for each mapping is the send time (ChngCD Arg4) of the Action Insert Record action object. An example is found within the acknowledging 544A step in the method 500 of FIG. 5A that responds to the receipt 541A of a request for acknowledgment. Preferably, each mapping also includes a send time of the mapping, according to the change recipient's clock (e.g., client's clock).

g. Receiving Ack of C-Dominant Changes (e.g., by Server)

When the server receives Action Ack Records action object(s) from the client (for record modifications and deletions), the server removes, for each client record ID that is acknowledged, all entr(ies) from the server's list of not-yet-acknowledged sent changes for that client record ID. The server also sets the status field gsT_SentAckd for each acknowledged change to the received send-time from the Action Ack Records action object, if the received send-time is later than the existing value of gsT_SentAckd. An example is found within the acknowledgment-receiving step 545A in the method 500 of FIG. 5A.

When the server receives Action Update Map action object(s) from the client (for record additions), the server records the received mappings into the mapping table corresponding to the client. For example, the server places the client record's record ID into the cR_ID field of the corresponding GUD record's row in the mapping table. The server also sets the status field gsT_SentAckd for each acknowledged change to the received value, if the received value is later than the existing value of gsT_SentAckd.

h. Requesting Ack of Maps (e.g., by Client)

The recipient of the c-dominant change can send an Action Request Ack Maps action object to request acknowledgment of the receipt of all maps sent since a particular time and/or all maps involving particular recipient record IDs (e.g., added client record IDs). The details of such a request are similar to the details of an Action Request Ack Record request and need not be described further. The client's requesting 548A of acknowledgment of reception of sent mappings in the method 500 of FIG. 5A is exemplary.

i. Sending Ack of Maps (e.g., by Server)

The change sender (e.g., server) responds to a received Action Request Ack Maps action object in a straightforward manner by sending one or more Action Ack Maps action object(s) that together contain the client record IDs (e.g., cR_ID in the client) of the received mappings for which acknowledgment is requested. An example is found within the acknowledging step 552A in the method 500 of FIG. 5A that responds to the receipt 549A of a request for acknowledgment of mappings. The details of such an acknowledgment are similar to the details of an Action Ack Records acknowledgment and need not be described further.

j. Receiving Ack of Maps (e.g., by Client)

The details of receiving an acknowledgment of mappings are similar to the details of receiving an acknowledgment of records. When the client receives an Action Ack Maps action object from the server, the client removes, for each client record mapping that is acknowledged, all entr(ies) from the inserted-record-to-be-acknowledged list for the mapping that have send time no later than the acknowledged send time. The client's receipt 553A of acknowledgments of mappings from the server in the method 500 of FIG. 5A is exemplary.

k. Determining Fresh Changes (e.g., by Server) In the First Place

Changes (deletions, modifications, additions) that have been made to any GUD record without a client's guaranteed knowledge are considered fresh changes with respect to the client. Preferably, the server sends fresh changes and only fresh changes to the client.

FIG. 9 shows a logic table 900 that describes a logic for determining whether a GUD record is fresh with respect to a particular client. The logic table 900 is used in the preferred embodiment, in which the server sends only c-dominant changes to the client and the client sends only c-untested changes to the server. There are six possible scenarios 901–906 under the logic table 900. The server may navigate the logic table 900 as follows for each GUD record to determine its freshness versus the client.

STEP 1: Determine the nature of any last transfer of a change involving the GUD record and the client. If there was no such transfer, i.e., if the GUD record is not yet mapped to the client, then scenario 901 applies, and determine the GUD record to be fresh. (The server can recognize that there was no such transfer by noticing that the GUD record has no non-empty entry in the mapping table or that gmT_ProcClientSend and gsT_SentAckd both equal <MIN>.) Otherwise, if the last transfer was a sending to the client with receipt later acknowledged (e.g., gsT_SentAckd >gmT_ProcClientSend), then proceed to STEP 2A. Otherwise, the last transfer was a received change from the client, and proceed to STEP 2B.

STEP 2A: If the GUD record has been modified since the last transfer (send) (e.g., gmT_ModByOther>gsT_

SentAckd), then determine the GUD record to be fresh. Otherwise, determine the GUD record to be not fresh.

STEP 2B: If the GUD record has been modified since the last transfer (receipt) (e.g., gmT_ModByOther>gsT_SentAckd), then determine the GUD record to be fresh. Otherwise, if after processing the received change from the client, it was determined that the client needed updating (e.g., because the client's change lost a conflict resolution) (e.g., bool_LostConflictClientSend=TRUE), then determine the GUD record to be fresh. Otherwise, determine the GUD record to be not fresh.

3. C-Conflicting Changes (e.g., Unresolved Conflict)

As previously mentioned, it is preferred that all datasets ever synchronized by the synchronizer provide globally-usable timestamps for their records and for their communications, such that the server can always perform automatic, timestamp-based (e.g., latest change wins) conflict resolution. Under this scenario, c-conflicting changes need not ever be sent, and preferably are not ever used. However, if the server detects a conflict but cannot compare timestamps in order to perform timestamp-based conflict resolution, it will prompt the user to make a choice between conflicting changes. Optionally, the server can detect a conflict and use the action object framework itself to delegate the user-assisted conflict-resolution task to a client accessor. This delegation is particularly useful if the server cannot otherwise present a user interface to the user—i.e., if the user is at the client and synchronizing wirelessly and has no browser open to the server.

The mechanism by which the server can delegate resolution of a detected conflict is as follows. First, the server detects a conflict and determines that the client should resolve this conflict (e.g., because the server determines that user-assisted conflict-resolution is necessary (e.g., because of non-comparable timestamps) and that the user is not currently logged into the server via a user interface). Next, the server sends the conflicting change(s) to the client (e.g., two or more conflicting changes including their (possibly non-comparable timestamps), optionally minus the values from the client's own corresponding dataset). The conflicting change(s) are flagged as conflicting, for example by being sent using the C-Conflicting versions of Action Update Record or Action Delete Record. When the client receives such conflicting changes, the client displays the conflicting values to the user and accepts input from the user that indicates the winning values to be kept. The client then sends the winning values back to the server using the C-Dominant versions of Action Update Record or Action Delete Record.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A computer-implemented method for synchronizing user data in a first dataset with user data in at least a second dataset via a communication medium, wherein the user data in the first dataset and the user data in the second dataset are capable of having been independently modified prior to the synchronization, the method comprising:

sending a dataset change from the first dataset;

receiving the dataset change via the communication medium;

determining whether the received dataset change, hereinafter referred to as the just-received change, was sent earlier than another dataset change from the first dataset that was received earlier than the receiving step, wherein the other dataset change is hereinafter referred to as the previously-received change; and performing synchronization of the first and the second datasets based at least in part on the determining step, wherein the performing step comprises:

if the just-received change is determined in the determining step to have been sent earlier than the previously-received change, refraining from propagating the just-received change into the second dataset; and otherwise, propagating the just-received change into the second dataset, at least to an extent needed for reconciling the just-received change with the second dataset.

2. The method of claim 1 wherein:

the first dataset resides on a first device and the second dataset resides on a second device; and the first and second devices are coupled to communicate with one another via the communication medium only occasionally.

3. The method of claim 2 wherein:

the sending step comprises sending the dataset change from the first device via the communication medium;

the receiving step comprises receiving the dataset change at the second device via the communication medium; and the determining step is performed at the second device.

4. The method of claim 1 wherein the communication medium is a wireless or wireline communication medium that is susceptible to non-FIFO delivery order.

5. The method of claim 4 wherein:

the just-received change involves a data record of the first dataset; and the previously-received change of the determining step also involves the first data record, wherein the propagating step is taken, and the refraining step is not taken, if the just-received change was sent earlier than a dataset change from the first dataset that was received earlier than the receiving step but that does not involve the data record.

6. The method of claim 1, wherein:

the sending step comprises sending an indicator of send order;

the receiving step comprises receiving the indicator of send order; and the determining step comprises determining, based at least in part on the received indicator of send order, whether the just-received change was sent earlier than the previously-received change.

7. The method of claim 6 wherein:

the indicator of send order includes a first timestamp, an indicator of send order associated with the previously-received change includes a second timestamp; and the determining step comprises determining that the just-received change was sent earlier than the previously-received change if the first timestamp is earlier than the second timestamp.

8. The method of claim 7 wherein the first and second timestamp are indicative of times at which the just-received change and the previously changes were respectively sent.

9. The method of claim 7 wherein:

the just-received change involves a data record of the first dataset and reflects a version of the data record; and the first timestamp is of a time at which the data record was last modified in the first dataset into the version reflected by the just-received change.

10. The method of claim 7 wherein the first timestamp and the second timestamp are according to a first clock used to record modification times in the first dataset, and the step of determining that the just-received change was sent earlier than the previously-received change if the first timestamp is earlier than the second timestamp needs not compare timestamps that are according to mutually different clocks.

11. The method of claim 10 wherein the second dataset includes records reflecting values entered by a user at a time indicated in the second dataset according to a second clock, wherein time readings of the first clock and time readings of the second clock cannot readily be converted into a common time zone.

12. The method of claim 10 wherein the first clock is a non-real-time clock.

13. The method of claim 6 wherein the communication medium is a distant wireless communication medium.

14. The method of claim 6 wherein the just-received change and the previously-received change include user appointment data or user contact data.

15. The method of claim 1 wherein the just-received change and the previously-received change include at least one member of the set consisting of a record addition, a record update, and a record deletion.

16. The method of claim 1 wherein:
the just-received change involves a data record of the first dataset and reflects a version of the data record, hereinafter referred to as the just-reflected version;
the method further comprises, prior to the receiving step, maintaining information that indicates a version of the data record, hereinafter referred to as the latest-known version, that is reflected by a latest-sent one of changes already received from the first dataset involving the data record;
the previously-received change reflects the latest-known version, and the determining step comprises using the maintained information to determine that the just-received change was sent earlier than the previously-received change if the just-reflected version is older than the latest-known version.

17. The method of claim 16 wherein:
a data record of the second dataset corresponds to the data record of the first dataset; and
the maintaining step comprises maintaining the information that indicates the latest-known version of the data record of the first dataset until the determining step, even if the data record of the second dataset is changed, prior to the receiving step, not due to synchronization with the first dataset.

18. The method of claim 16 wherein the maintained information includes an indication of a send time at which a change, received prior to the receiving step, that reflects the latest-known version was sent from the first dataset.

19. The method of claim 16 wherein:
the second dataset includes a plurality of data records known to correspond to a plurality of data records of the first dataset other than the data record;
the method further comprises maintaining information that indicates, for each of the plurality of data records of the second dataset, a version of a corresponding one of the plurality of data records of the first dataset, which version is reflected by a latest-sent one of changes already received from the first dataset involving the corresponding one of the plurality of data records of the first dataset.

20. The method of claim 19 wherein:
the first dataset resides on a first device and the second datasets resides on a second device; and
the steps of maintaining information comprise maintaining a status field for each of the plurality of data records of the second dataset on the second device.

21. The method of claim 19 wherein the status fields need not be updated during ordinary, non-synchronization viewing or modification of the client dataset by the user.

22. The method of claim 1 wherein the communication medium includes a member of the set consisting of an electronic mail network and a wireless paging network.

23. The method of claim 1 wherein the just-received change and the previously-received change include at least one member of the set consisting of a record update containing user-entered information and a record deletion.

24. The method of claim 1 wherein the performing synchronization step further comprises:
sending a dataset change from the second dataset;
receiving the dataset change from the second dataset via the communication medium;
determining whether the received dataset change from the second dataset was sent earlier than another dataset change from the second dataset that was received earlier than the step of receiving the dataset change from the second dataset; and
performing synchronization of the first and the second datasets based at least in part on the step of determining whether the received dataset change from the second dataset was sent earlier than the other dataset change from the second dataset.

25. The method of claim 24 wherein:
the first dataset resides on a first device with a first processor and the second dataset resides on a second device with a second processor; and
the first and second devices are capable of communicating with each another via the communication medium;
the step of sending the dataset change from the first dataset is performed by the first device;
the step of receiving the dataset change from the first dataset is performed by the second device;
the step of determining whether the just-received change was sent earlier than the previously-received change is performed by the second device;
the step of sending the dataset change from the second dataset is performed by the second device;
the step of receiving the dataset change from the second dataset is performed by the first device; and
the step of determining whether the received dataset change from the second dataset was sent earlier than the other dataset change from the second dataset is performed by the first device.

26. A computer-implemented method for synchronizing user data in a first dataset with user data in at least a second dataset via a communication medium, wherein the user data in the first dataset and the user data in the second dataset are capable of having been independently modified prior to the synchronization, the method comprising:
sending a dataset change from the first dataset;
receiving the dataset change via the communication medium;
determining whether the received dataset change, hereinafter referred to as the just-received change, was sent earlier than another dataset change from the first dataset that was received earlier than the receiving step, wherein the other dataset change is hereinafter referred to as the previously-received change; and performing synchronization of the first and the second datasets based at least in part on the determining step, wherein the performing step comprises:
- if the just-received change is determined in the determining step to have been sent earlier than the previously-received change, refraining from propagating the just-received change into the second dataset; and
- otherwise, propagating the just-received change into the second dataset, at least to an extent needed for reconciling the just-received change with the second dataset;

wherein:
- the sending step comprises sending an indicator of send order;
- the receiving step comprises receiving the indicator of send order; and
- the determining step comprises determining, based at least in part on the received indicator of send order, whether the just-received change was sent earlier than the previously-received change;

and wherein the method further comprises:
- prior to the receiving step, receiving the previously-received change, whereby the previously-received change becomes previously-received, and also receiving an indicator of send order associated with the previously-received change; and
- storing information to indicate send order, based on the received indicator of send order associated with the previously-received change;
- wherein the determining step comprises determining, based at least in part on the received indicator of send order and the stored information, whether the just-received change was sent earlier than the previously-received change.

27. The method of claim 26 wherein:
the just-received change involves a data record of the first dataset and reflects a version of the data record; and
the step of storing the information to indicate send order comprises storing information that is indicative of a version of the data record that is reflected by a latest-sent one of changes already received from the first dataset involving the data record.

28. The method of claim 27 further comprising, if the just-received change is determined in the determining step to have been sent later than the previously-received change, updating the stored information to indicate send order, based on the received indicator of send order that was sent in the sending step, for future use in receiving and processing further dataset changes.

29. A system for synchronizing user data in a first dataset with user data in at least a second dataset via a communication network, wherein the user data in the first dataset and the user data in the second dataset are capable of having been independently modified prior to the synchronization, the system comprising:
means for sending a dataset change from the first dataset;
means for receiving the dataset change via the communication network;
means for determining whether the received dataset change, hereinafter referred to as the just-received change, was sent earlier than another dataset change from the first dataset that was received earlier than was the just-received change, wherein the other dataset change is hereinafter referred to as the previously-received change; and
means for performing synchronization of the first and the second datasets based at least in part on whether the just-received change was sent earlier than the previously-received change.

30. The system of claim 29 wherein means for sending a dataset change includes means for sending a record update or a record deletion.

31. The system of claim 29 wherein the means for performing synchronization is configured to refrain from propagating the just-received change into the second dataset to thereby modify user data in the second dataset, if the just-received change was determined by the determining means to have been sent earlier than the previously-received change.

32. The system of claim 31 wherein the means for performing synchronization is configured to propagate the just-received change into the second dataset, at least to an extent for reconciling the just-received change with the second dataset, if the just-received change was determined by the determining means not to have been sent earlier than the previously-received change.

33. The system of claim 32 wherein:
the just-received change involves a data record of the first dataset;
the previously-received change is any change from the first dataset that was received earlier than was the just-received change and that also involves the data record; and
the means for performing synchronization propagates the just-received change into the second dataset, at least to an extent for reconciling the just-received change with the second dataset, if the just-received change was sent earlier than a dataset change from the first dataset that was received earlier than was the just-receiving change but that does not involve the data record.

34. The system of claim 29 wherein the communication network includes an electronic mail network or a wireless paging network.

35. A system for synchronizing a first dataset residing on a first device with a second dataset residing on a second device, wherein the first and second devices are capable of mutual communication via a communication network, the system comprising:
a first synchronization interface configured to access the first dataset and to send synchronization messages reflecting user information of the first dataset via the communication network;
status information associated with the second dataset about past synchronization activity between the first and second datasets; and
a second synchronization interface configured to access the second dataset, to access and maintain the status information, and to receive synchronization messages reflecting user information of the first dataset via the communication network, wherein the second synchronization interface is further configured:
to refrain from altering user information in the second dataset in response to a received synchronization message, hereinafter referred to as the just-received message, sent by the first synchronization interface if the just-received message was sent earlier but received later than another synchronization message from the first dataset, hereinafter referred to as the earlier-received message; and to alter user information in the second dataset in response to the just-received message, at least to an extent for reconciling the first and second datasets, if the just-received message was not both sent earlier and received later than the earlier-received message.

36. The system of claim 35 wherein:

the first synchronization interface comprises a synchronization engine configured for synchronizing the first dataset with the second dataset as well as a third dataset; and the second synchronization interface comprises a synchronization accessor configured for synchronizing the second dataset with the first dataset.

37. The system of claim 35 wherein:

the first synchronization interface is configured, when sending a synchronization message reflecting a data record of the first dataset, to include a version indicator of the reflected data record; and the second synchronization interface is configured to determine whether the just-received synchronization message was sent earlier but received later than the earlier-received message based on the version indicator and the status information.

38. The system of claim 37 wherein:

the first dataset uses a first clock;

the version indicator and the status information include information based on timestamps from the first clock; and the second synchronization interface is configured to determine whether the just-received message was sent earlier but received later than the earlier-received message based on the version indicator and the status information without needing to compare any timestamp from the first clock with any timestamp based on any clock other than the first clock.

39. The system of claim 37 wherein the version indicator indicates a send time based on a first clock used by the first device.

40. The system of claim 37 wherein:

the status information includes a version indicator, hereinafter referred to as the known-last version indicator, for a data record of the first dataset as reflected by a latest-sent one of received messages from the first dataset; and the second synchronization interface is configured maintain the known-last version indicator even if a data record of the second dataset that corresponds to the data record of the first dataset has since been overwritten with information from a source other than the first dataset.

41. The system of claim 35 wherein:

the just-received message reflects a first data record of the first dataset;

the earlier-received message also reflected the first data record; and the second interface is configured to alter user information in the second dataset in response to the just-received message, at least to an extent for reconciling the first and second datasets, if the just-received message was both sent earlier and received later than another synchronization message from the first dataset that reflects a data record of the first dataset other than first data record.

42. The system of claim 35 wherein the communication network includes a message-based wireless or wireline network.

* * * * *